(12) United States Patent  
Rangarajan et al.

(10) Patent No.: US 9,009,318 B2  
(45) Date of Patent: Apr. 14, 2015

(54) OFFLINE RESOURCE ALLOCATION ALGORITHMS

(75) Inventors: Nikhil Devanur Rangarajan, Redmond, WA (US); Kamal Jain, Bellevue, WA (US); Balasubramanian Sivan, Tamil Nadu (IN); Christopher A. Wilkens, Fremont, CA (US)

(73) Assignee: Microsoft Corporation, Redmond, WA (US)

( * ) Notice: Subject to any disclaimer, the term of this patent is extended or adjusted under 35 U.S.C. 154(b) by 171 days.

(21) Appl. No.: 13/348,465

(22) Filed: Jan. 11, 2012

(65) Prior Publication Data

US 2013/0117454 A1 May 9, 2013

Related U.S. Application Data

(63) Continuation-in-part of application No. 13/288,650, filed on Nov. 3, 2011.

(51) Int. Cl.
```
G06F 15/173    (2006.01)
G06F 9/50      (2006.01)
H04L 29/08     (2006.01)
```
(Continued)

(52) U.S. Cl.
CPC .......... *G06F 9/5011* (2013.01); *G06Q 10/0631* (2013.01); *H04L 29/08144* (2013.01); *H04L 29/08153* (2013.01); *H04L 29/06* (2013.01)

(58) Field of Classification Search
CPC ............ G06F 9/5011; G06Q 10/0631; G06Q 10/0633; H04N 28/00; H04N 88/16; H04N 21/2393; H04L 29/08144; H04L 29/08153; H04L 29/08162; H04L 29/06; H04L 29/08072
USPC ...................... 709/226; 370/254; 705/7.25, 14
See application file for complete search history.

(56) References Cited

U.S. PATENT DOCUMENTS 6,044,361 A    3/2000   Kalagnanam et al.
6,665,653 B1*  12/2003  Heckerman et al. ............ 706/47
6,714,975 B1   3/2004   Aggarwal et al.

(Continued)

OTHER PUBLICATIONS

"Display Inventory Allocation Optimization", Retrieved at <<http://labs.yahoo.com/event/60>> Retrieved Date: Oct. 17, 2011, p. 1.

(Continued)

*Primary Examiner* — Thu Ha Nguyen

(74) *Attorney, Agent, or Firm* — Dan Choi; Judy Yee; Micky Minhas

(57) ABSTRACT

Various embodiments provide offline algorithms for resource allocation. A known set of "offline" requests may be matched to available resources using an online resource allocation algorithm that models the offline resource allocation problem as though the requests were received stochastically. Requests may be scaled and then sampled to provide random, stochastic input for the online resource allocation algorithm. For each request, resources are allocated to the request by evaluating multiple options based upon shadow costs assigned to resources associated with the different options. After each request is processed, an adjustment is made to the shadow costs for remaining resources to reflect differences in rates for allocation and/or consumption of the resources and the updated shadow costs are used for a subsequent request. A scaled resource allocation determined using sampled requests in this manner may be scaled back up to obtain a solution for the offline resource allocation problem.

20 Claims, 8 Drawing Sheets

(51) Int. Cl.
*G06Q 10/06* (2012.01)
*H04L 29/06* (2006.01)

(56) References Cited

U.S. PATENT DOCUMENTS

| | | | |
|---|---|---|---|
| 6,990,459 B2 | 1/2006 | Schneider | |
| 7,039,931 B2 | 5/2006 | Whymark | |
| 7,546,249 B2 | 6/2009 | Main | |
| 7,627,878 B2 | 12/2009 | Pouliot et al. | |
| 7,653,794 B2* | 1/2010 | Michael et al. | 711/162 |
| 7,738,984 B2 | 6/2010 | Denton et al. | |
| 8,001,004 B2 | 8/2011 | Protheroe et al. | |
| 8,005,710 B2* | 8/2011 | Vishnumurty et al. | 705/7.11 |
| 8,082,549 B2 | 12/2011 | Corley, Jr. et al. | |
| 8,224,689 B1* | 7/2012 | Sandberg et al. | 705/7.35 |
| 8,234,139 B2 | 7/2012 | Wan et al. | |
| 8,260,831 B2* | 9/2012 | Tyrrell et al. | 707/823 |
| 8,300,798 B1* | 10/2012 | Wu et al. | 379/265.11 |
| 8,352,611 B2 | 1/2013 | Maddhuri et al. | |
| 8,874,477 B2* | 10/2014 | Hoffberg | 705/37 |
| 8,922,559 B2 | 12/2014 | Charles et al. | |
| 2002/0049608 A1 | 4/2002 | Hartsell et al. | |
| 2002/0103688 A1 | 8/2002 | Schneider | |
| 2003/0035429 A1 | 2/2003 | Mitra et al. | |
| 2003/0154282 A1* | 8/2003 | Horvitz | 709/226 |
| 2003/0225635 A1 | 12/2003 | Renz et al. | |
| 2003/0236745 A1 | 12/2003 | Hartsell et al. | |
| 2004/0010592 A1* | 1/2004 | Carver et al. | 709/226 |
| 2004/0044571 A1 | 3/2004 | Bronnimann et al. | |
| 2004/0257858 A1 | 12/2004 | Mansingh et al. | |
| 2004/0267686 A1 | 12/2004 | Chayes et al. | |
| 2005/0102398 A1 | 5/2005 | Zhang et al. | |
| 2005/0144065 A1* | 6/2005 | Calabria et al. | 705/14 |
| 2005/0234935 A1 | 10/2005 | Barsness et al. | |
| 2006/0049468 A1 | 3/2006 | Cheng et al. | |
| 2006/0070019 A1* | 3/2006 | Vishnumurty et al. | 717/101 |
| 2006/0080171 A1 | 4/2006 | Jardins et al. | |
| 2006/0089140 A1 | 4/2006 | Zhang | |
| 2006/0167784 A1* | 7/2006 | Hoffberg | 705/37 |
| 2006/0253328 A1 | 11/2006 | Kohli et al. | |
| 2007/0016473 A1 | 1/2007 | Anderson et al. | |
| 2007/0016918 A1 | 1/2007 | Alcorn et al. | |
| 2007/0027756 A1 | 2/2007 | Collins et al. | |
| 2007/0083885 A1 | 4/2007 | Harding | |
| 2007/0087756 A1* | 4/2007 | Hoffberg | 455/450 |
| 2007/0118432 A1 | 5/2007 | Vazirani et al. | |
| 2007/0162882 A1 | 7/2007 | Ueda | |
| 2007/0198350 A1 | 8/2007 | O'Kelley et al. | |
| 2007/0214115 A1 | 9/2007 | Liu et al. | |
| 2007/0255690 A1 | 11/2007 | Chang et al. | |
| 2007/0256095 A1 | 11/2007 | Collins | |
| 2007/0260831 A1* | 11/2007 | Michael et al. | 711/162 |
| 2007/0294319 A1* | 12/2007 | Mankad et al. | 707/204 |
| 2008/0004990 A1 | 1/2008 | Flake et al. | |
| 2008/0010304 A1 | 1/2008 | Vempala et al. | |
| 2008/0016217 A1 | 1/2008 | Astley et al. | |
| 2008/0071603 A1 | 3/2008 | Denton et al. | |
| 2008/0080396 A1* | 4/2008 | Meijer et al. | 370/254 |
| 2008/0134193 A1 | 6/2008 | Corley et al. | |
| 2008/0177994 A1* | 7/2008 | Mayer | 713/2 |
| 2008/0255937 A1 | 10/2008 | Chang et al. | |
| 2008/0256034 A1 | 10/2008 | Chang et al. | |
| 2008/0275899 A1 | 11/2008 | Baluja et al. | |
| 2008/0313089 A1 | 12/2008 | Du Preez | |
| 2009/0037267 A1 | 2/2009 | Duggal et al. | |
| 2009/0070177 A1 | 3/2009 | Agarwal et al. | |
| 2009/0106184 A1 | 4/2009 | Lang et al. | |
| 2009/0144168 A1 | 6/2009 | Grouf et al. | |
| 2009/0248478 A1 | 10/2009 | Duggal et al. | |
| 2009/0254420 A1 | 10/2009 | Curd et al. | |
| 2009/0313120 A1 | 12/2009 | Ketchum | |
| 2010/0042496 A1 | 2/2010 | Wang et al. | |
| 2010/0082393 A1 | 4/2010 | Vassilvitskii et al. | |
| 2010/0082412 A1 | 4/2010 | Brower et al. | |
| 2010/0106332 A1* | 4/2010 | Chassin et al. | 700/278 |
| 2010/0106641 A1* | 4/2010 | Chassin et al. | 705/40 |
| 2010/0121694 A1 | 5/2010 | Bharadwaj et al. | |
| 2010/0131592 A1 | 5/2010 | Zhang et al. | |
| 2010/0175111 A1 | 7/2010 | Schreiber et al. | |
| 2010/0191558 A1 | 7/2010 | Chickering et al. | |
| 2010/0279600 A1 | 11/2010 | Noh et al. | |
| 2010/0299215 A1 | 11/2010 | Feldman et al. | |
| 2011/0106922 A1 | 5/2011 | Bouillet et al. | |
| 2011/0126207 A1 | 5/2011 | Wipfel et al. | |
| 2011/0145512 A1 | 6/2011 | Adl-Tabatabai et al. | |
| 2011/0187717 A1* | 8/2011 | Jagannath et al. | 345/440 |
| 2011/0208559 A1 | 8/2011 | Fontoura et al. | |
| 2011/0231215 A1 | 9/2011 | Santos et al. | |
| 2011/0234594 A1 | 9/2011 | Charles et al. | |
| 2011/0238490 A1 | 9/2011 | Simard et al. | |
| 2011/0246312 A1 | 10/2011 | Meek et al. | |
| 2011/0251889 A1 | 10/2011 | Simard et al. | |
| 2011/0258045 A1 | 10/2011 | Chickering et al. | |
| 2011/0320606 A1* | 12/2011 | Madduri et al. | 709/226 |
| 2012/0265884 A1 | 10/2012 | Zhang et al. | |
| 2013/0013357 A1 | 1/2013 | Liu et al. | |
| 2013/0046924 A1 | 2/2013 | Adl-Tabatabai et al. | |
| 2013/0046925 A1 | 2/2013 | Adl-Tabatabai et al. | |
| 2013/0117062 A1* | 5/2013 | Rangarajan et al. | 705/7.25 |
| 2013/0117454 A1* | 5/2013 | Rangarajan et al. | 709/226 |
| 2013/0242185 A1* | 9/2013 | Roth et al. | 348/441 |
| 2014/0185581 A1* | 7/2014 | Senarath et al. | 370/331 |

OTHER PUBLICATIONS

Ranjan, et al., "High-Performance Resource Allocation and Request Redirection Algorithms for Web Clusters", Retrieved at <<http://ieeexplore.ieee.org/stamp/stamp.jsp?arnumber=04407691>>, IEEE Transactions on Parallel and Distributed Systems, Sep. 2008, pp. 1186-1200.

Arora, et al., "On the Benefit of Virtualization: Strategies for Flexible Server Allocation", Retrieved at <<http://www.usenix.org/event/hotice11/tech/full_papers/Arora.pdf>>, USENIX Workshop on Hot Topics in Management of Internet, Cloud, and Enterprise Networks and Services (Hot-ICE), 2011, pp. 6.

Feldman, et al., "Offline Optimization for Online Ad Allocation", Retrieved at <<http://citeseerx.ist.psu.edu/viewdoc/download-?doi=10.1.1.163.6124&rep=rep1&type=pdf>>, Fifth Workshop on Ad Auctions, 2009, pp. 8.

Arora, et al., "The Multiplicative Weights Update Method: A Meta Algorithm and Applications", Retrieved at <<https://www.cs.princeton.edu/~arora/pubs/MWsurvey.pdf>>, Technical report, 2005, pp. 1-31.

Abrams, et al., "Optimal Delivery of Sponsored Search Advertisements Subject to Budget Constraints", Retrieved at <<http://www.site.uottawa.ca/~ttran/teaching/csi5389/papers/Optimal_Delivery_of_Sponsored_Search.pdf>>, Proceedings of the 8th ACM conference on Electronic commerce, Jun. 11-15, 2007, pp. 272-278.

Agrawal, et al., "A Dynamic Near-optimal Algorithm for Online Linear Programming", Retrieved at <<http://sites.google.com/site/wangzz44072/paper.pdf>>, Nov. 18, 2009, pp. 1-20.

Buchbinder, et al., "Online Primal-Dual Algorithms for Maximizing Ad-auctions Revenue", Retrieved at <<http://www.openu.ac.il/Personal_sites/niv-buchbinder/download/ad-auctions-esa07.pdf>>, Proceedings of the 15th annual European conference on Algorithms, 2007, pp. 253-264.

Bahmani, et al., "Improved Bounds for Online Stochastic Matching", Retrieved at <<http://www.stanford.edu/~kapralov/papers/stochastic-final.pdf>>, In ESA, 2010, pp. 170-181.

Charles, et al., "Fast Algorithms for Finding Matchings in Lopsided Bipartite Graphs with Applications to Display Ads", Retrieved at <<http://research.microsoft.com/en-us/um/people/nikdev/pubs/waterlevel.pdf>>, Proceedings of the 11th ACM conference on Electronic commerce, Jun. 7-11, 2010, pp. 121-128.

Chakraborty, et al., "Selective Call Out and Real-time Bidding", Retrieved at <<http://www.seas.upenn.edu/~tanmoy/papers/CEGMM10_cop.pdf>>, In WINE, Feb. 16, 2010, pp. 1-22.

Devanur, et al., "The Adwords Problem: Online Keyword Matching with Budgeted Bidders under Random Permutations", Retrieved at

(56) References Cited

OTHER PUBLICATIONS

<<http://research.microsoft.com/en-us/um/people/nikdev/pubs/adwords.pdf>>, ACM Conference on Electronic Commerce, Jul. 6-10, 2009, pp. 71-78.
Feldman, et al., "Online Stochastic Packing Applied to Display Ad Allocation", Retrieved at <<http://arxiv.org/PS_cache/arxiv/pdf/1001/1001.5076v2.pdf>>, In ESA, Feb. 17, 2010, pp. 1-19.
Fleischer, et al., "Approximating Fractional Multicommodity Flow Independent of the Number of Commodities", Retrieved at <<http://citeseerx.ist.psu.edu/viewdoc/download;jsessionid=E6638A82AF0956F62000FA3228DF2591?doi=10.1.1.83.8312&rep=rep1&type=pdf>>, SIAM Journal on Discrete Mathematics, Oct.-Nov. 2000, pp. 1-16.
Feldman, et al., "Online Stochastic Matching: Beating 1-1/e", Retrieved at <<http://ieeexplore.ieee.org/stamp/stamp.jsp?tp=&arnumber=5438641>>, Proceedings of the 2009 50th Annual IEEE Symposium on Foundations of Computer Science, 2009, pp. 117-126.
Garg, et al., "Faster and Simpler Algorithms for Multicommodity Flow and Other Fractional Packing Problems", Retrieved at <<http://ieeexplore.ieee.org/stamp/stamp.jsp?tp=&arnumber=743463&userType=inst>>, Proceedings of the 39th Annual Symposium on Foundations of Computer Science, 1998, pp. 1-12.
Goel, et al., "Online Budgeted Matching in Random Input Models with Applications to Adwords", Retrieved at <<http://www.cc.gatech.edu/grads/g/gagang/onlineBudgetedMatching.pdf>>, Proceedings of the nineteenth annual ACM-SIAM symposium on Discrete algorithms, 2008, pp. 17.
Karande, et al., "Online Bipartite Matching with Unknown Distributions", Retrieved at <<http://www.cc.gatech.edu/—tpushkar/papers/bipartite.pdf>>, In STOC, Jun. 6-8, 2011, pp. 10.
Kalyanasundaram, et al., "An Optimal Deterministic Algorithm for Online B-matching", Retrieved at <<http://citeseer.ist.psu.edu/viewdoc/download;jsessionid=9A3C770548ABF0F11AD0B53C2D6155AF?doi=10.1.1.56.8916&rep=rep1&type=pdf>>, Theoretical Computer Science, Feb. 28, 2000, pp. 1-9.
Kamath, et al., "Routing and Admission Control in General Topology Networks with Poisson Arrivals", Retrieved at <<http://citeseer.ist.psu.edu/viewdoc/download;jsessionid=1A574079E138D09EF8DAB9EA19AA2678?doi=10.1.1.31.5443&rep=rep1&type=pdf>>, Proceedings of the seventh annual ACM-SIAM symposium on Discrete algorithms, 1996, pp. 1-10.
Manshadi, et al., "Online Stochastic Matching: Online Actions based on Offline Statistics", Retrieved at <<http://siam.org/proceedings/soda/2011/SODA11_097_manshadiv.pdf>>, In Proceedings of SODA, 2011, pp. 1285-1294.
Motwani, et al., "Fractional Matching via Balls-and-bins", Retrieved at <<http://theory.stanford.edu/~xuying/papers/match-random.pdf>>, In Approx-Random, 2006, pp. 1-11.
Mehta, et al., "AdWords and Generalized On-line Matching", Retrieved at <<http://ieeexplore.ieee.org/stamp/stamp.jsp?tp=&arnumber=1530720>>, Proceedings of the 46th Annual IEEE Symposium on Foundations of Computer Science (FOCS), 2005, pp. 264-273.
Mahdian, et al., "Online Bipartite Matching with Random Arrivals: An Approach based on Strongly Factor-revealing LPs", Retrieved at <<http://www.stanford.edu/~qiqiyan/papers/stoc11b.pdf>>, In STOC, Jun. 6-8, 2011, pp. 9.
Plotkin, et al., "Fast Approximation Algorithms for Fractional Packing and Covering Problems", Retrieved at <<http://ieeexplore.ieee.org/stamp/stamp.jsp?tp=&arnumber=185411>>, Proceedings of the 32nd annual symposium on Foundations of computer science, 1991, pp. 495-504.
Vee et al., "Optimal Online Assignment with Forecasts", Retrieved at <<http://theory.stanford.edu/~sergei/papers/ec10-lagrange.pdf>>, Proceedings of the 11th ACM conference on Electronic commerce, Jun. 7-11, 2010, pp. 109-118.
Young, et al., "Randomized Rounding without Solving the Linear Program", Retrieved at <<http://www.cs.ucr.edu/~neal/non_arxiv/SODA_1995_170.pdf>>, Proceedings of the sixth annual ACM-SIAM symposium on Discrete algorithms, 1995, pp. 170-178.
"Online Resource Allocation Algorithms", 113288650, Filed Date: Nov. 3, 2011, pp. 44.
"Final Office Action", U.S. Appl. No. 12/732,031, (Jan. 30, 2013), 15 pages.
"Non-Final Office Action", U.S. Appl. No. 12/748,014, (Apr. 25, 2013), 19 pages.
"Non-Final Office Action", U.S. Appl. No. 13/288,650, (Mar. 29, 2013), 17 pages.
Von Luxburg, Ulrike "A tutorial on spectral clustering", *Statistics and Computing*, vol. 17 Issue 4, *Springer Science+Business Media, LLC*, (Aug. 22, 2007), pp. 395-416.
"Final Office Action", U.S. Appl. No. 12/751,533, (Oct. 25, 2012), 10 pages.
"Final Office Action", U.S. Appl. No. 12/757,634, (Oct. 11, 2012), 14 pages.
"Final Office Action", Application No. 12/761,961, (Oct. 19, 2012), 14 pages.
"Restriction Requirement", U.S. Appl. No. 13/288,650, (Dec. 10, 2012), 9 pages.
Aggarwal, Gagan et al., "Truthful Auctions for Pricing Search Keywords", *EC 2006*, Available at <<http://delivery.acm.org/10.1145/1140000/1134708/p1-aggarwal.pdf?key1=1134708&key2=3637314621&coll=GUIDE&dl=GUIDE&CFID=74229622&CFTOKEN=92771433>,(Jun. 2006),pp. 1-7.
Alaei, Saeed "Online Allocation of Display Advertisements Subject to Advanced Sales Contracts", *ADKDD 2009*, Available at <http://research.yahoo.com/files/23ADKDD09.pdf>,(Jun. 2009),9 pages.
Babaioff, Moshe et al., "Matroids, Secretary Problems, and Online Mechanisms", *Proceedings of the Eighteenth Annual ACM-SIAM Symposium on Discrete Algorithms*, Available at <http://www.cs.cornell.edu/~rdk/papers/matsec.pdf>,(2007),10 pages.
Balcan, Maria-Florina et al., "Mechanism Design via Machine Learning", *FOCS 2005*, Available at <http://www.cs.tau.ac.il/~mansour/papers/05-focs-aa.pdf>,(Oct. 2005),10 pages.
Borgs, Christian et al., "Multi-Unit Auctions with Budget-Constrained Bidders", *Proceedings of the 6th ACM Conference on Electronic Commerce*, Available at <http://research.microsoft.com/en-us/um/people/borgs/Papers/budget.pdf>,(2005),pp. 1-11.
Constantin, Florin et al., "An Online Mechanism for Ad Slot Reservations with Cancellations", *Proceedings of the twentieth Annual ACM-SIAM Symposium on Discrete Algorithms*, Available at <http://www.siam.org/proceedings/soda/2009/SODA09_137_constantinf.pdf>,(2009),pp. 1265-1274.
Edelman, Benjamin et al., "Internet Advertising and the Generalized Second-Price Auction: Selling Billions of Dollars Worth of Keywords", Available at <http://rwj.berkeley.edu/schwarz/publications/gsp051003.pdf>,(Oct. 3, 2005),pp. 1-21.
Edelman, Benjamin et al., "Strategic Bidder Behavior in Sponsored Search Auctions", *Decision Support Systems*, vol. 43, Issue 1, Available at <http://www.benedelman.org/publications/cycling-060703.pdf>,(Feb. 2007),pp. 1-12.
Feldman, Jon et al., "Budget Optimization in Search-Based Advertising Auctions", *EC 2007*, Available at <http://algo.research.googlepages.com/uniform.pdf>,(Jun. 2007),pp. 40-49.
Goel, Ashish et al., "Price Based Protocols for Fair Resource Allocation:Convergence Time Analysis and Extension to Leontief Utilities", *Proceedings of the nineteenth annual ACM-SIAM symposium on Discrete algorithms*, available at <http://research.microsoft.com/en-us/people/hamidnz/fair-price-based-protocols-soda08.pdf>,(2008),9 pages.
Hoeffding, Wassily "Probability Inequalities for Sums of Bounded Random Variables", *Journal of the American Statistical Association*, vol. 58, No. 301, Abstract Retrieved from: <http://www.jstor.org/pss/2282952> on Jan. 21, 2010,(Mar. 1963),2 pages.
Karp, Richard M., "An Optimal Algorithm for On-Line Bipartite Matching", *Proceedings of the Twenty-Second Annual ACM Symposium on Theory of Computing*, Available at <http://www.eecs.berkeley.edu/~vazirani/pubs/online.pdf>,(1990),pp. 352-358.
Kleinberg, Robert "A Multiple-Choice Secretary Algorithm with Applications to Online Autions", *Proceedings of the Sixteenth Annual ACM-SIAM Symposium on Discrete Algorithms*, http://delivery.acm.org/10.1145/1080000/1070519/p630-kleinberg.pdf?key1=1070519&key2=0877314621&coll=GUIDE&dl=GUIDE&CFID=72544299&CFTOKEN=88467143,(2005),pp. 630-631.

(56) References Cited

OTHER PUBLICATIONS

Lahaie, Sebastien "An Analysis of Alternative Slot Auction Designs for Sponsored Search", *EC 2006*, Available at <http://research.yahoo.com/files/fp185-lahaie.pdf>,(Jun. 2006),10 pages.

Mahdian, Mohammad "Allocating Online Advertisement Space with Unreliable Estimates", *ACM Conference on Electronic Commerce*, Available at <http://www.stanford.edu/~saberi/hamid-adwords.pdf>,(2007),pp. 1-11.

Nisan, Noam "Algorithmic Game Theory", *Sponsored Search Auctions*, Available at <http://www.stanford.edu/~saberi/sponsored-search.pdf>,(Sep. 24, 2007),pp. 1-25.

Radovanovic, Ana et al., "Revenue Maximization Through 'Smart' Inventory Management in Reservation-Based Online Advertising", *Sigmetrics Performance Evaluation Review*, available at <http://www.anaradovanovic.com/AllocPoliciesMaMAsub.pdf>,(2010),3 pages.

Rangarajan, et al., "Online Resource Allocation Algorithms", U.S. Appl. No. 13/288,650, (Nov. 3, 2011),44 pages.

Schwind, Michael et al., "Using Shadow Prices for Resource Allocation in a Combinatorial Grid With Proxy-Bidding Agents", available at <http://www.wiiw.de/publikationen/UsingShadowPricesforResourceAl1596.pdf/~saberi/adwords.pdf>,(2006),8 pages.

Varian, Hal R., "Position Auctions", *International Journal of Industrial Organization*, vol. 25, Available at <http://people.ischool.berkeley.edu/~hal/Papers/2006/position.pdf>,(2007),pp. 1163-1178.

"Display Inventory Allocation Optimization", retrieved from <http://labs.yahoo.com/event/60> on Jul. 1, 2011, 1.

"Graph Partitioning", Retrieved from: <http://research.yahoo.com/node/2368> on Jan. 20, 2010, 1 page.

"Non-Final Office Action", /U.S. Appl. No. 12/761,961, (Jun. 19, 2012), 12 pages.

"Non-Final Office Action", U.S. Appl. No. 12/732,031, (Sep. 7, 2012), 14 pages.

"Non-Final Office Action", U.S. Appl. No. 12/751,533, (Aug. 28, 2012), 9 pages.

"Non-Final Office Action", U.S. Appl. No. 12/757,634, (Jun. 19, 2012), 11 pages.

"Restriction Requirement", U.S. Appl. No. 12/751,533, (Jun. 28, 2012), 10 pages.

Abrams, Zoe et al., "Optimal Delivery of Sponsored Search Advertisements Subject Budget Constraints", Retrieved at <<http://www.site.uottawa.ca/~ttran/teaching/csi5389/papers/Optimal_Delivery_of_Sponsored_Search.pdf>>, EC'07, San Diego, California, USA. Copyright 2007 ACM 978-1-59593-653-0/07/0006,(Jun. 11-15, 2007), pp. 272-278.

Anastasakos, Tasos et al., "A Collaborative Filtering Approach to Sponsored Search", Retrieved at <<http://research.yahoo.com/files/YL-2009-006-query-ad-click-graph.pdf>>, Yahoo! Labs Technical Report No. YL-2009-006,(Aug. 14, 2009), 24 pages.

Carrasco, John J., "Clustering of bipartite advertiser-keyword graph", *Overture Research*, Available at <http://www.soe.ucsc.edu/classes/ism293/Spring09/material/papers/lec6/custeringBidTerms.pdf>,(2003), 8 pages.

Chickering, David M., et al., "Goal-Oriented Clustering", *Microsoft Research*, Available at <http://research.microsoft.com/en-us/um/people/dmax/publications/goalclust.pdf>,(May 2000), 9 pages.

Chickering, David M., et al., "Targeted Advertising with Inventory Management", *EC '00*, Available at <http://research.microsoft.com/en-us/um/people/dmax/publications/ec00.pdf>,(Aug. 25, 2000), 5 pages.

Chickering, David M., "Targeted Internet Advertising Using Predictive Clustering and Linear Programming", *Microsoft Research*, Available at <http://www.mapscapital.com/files/TargetedAdsPredictiveClusters.pdf>, 7 pages.

Davis, Jeff "Truviso 3.2", Retrieved from: <http://www.truviso.com/blog/> on Feb. 24, 2010, (Sep. 4, 2009), 6 pages.

Feldman, Jon et al., "Budget Optimization in Search-Based Advertising Auctions", Retrieved at <<http://algo.research.googlepages.com/uniform.pdf>>, EC'07, San Diego, California, USA. Copyright 2007 ACM 978-1-59593-653-0/07/0006,(Jun. 11-15, 2007), pp. 40-49.

Lang, Kevin J., "Finding Dense and Isolated Submarkets in a Sponsored Search Spending Graph", *CIKM 2007*, (Nov. 2007), 10 pages.

Lang, Kevin J., et al., "Finding Dense and Isolated Submarkets in a Sponsored Search Spending Graph", Retrieved at <<http://www.google.co.in/url?sa=t&source=web&ct=res&cd=3&ved=0CBMQFjAC&url=http%3A%2F%2Fresearch.yahoo.com%2Ffiles%2Fcikm636-langk.pdf&rct=j&q=%22Finding+dense+and+isolated+submarkets+in+a+sponsored+search+spending+graph+by+Kevin+J.+Lang+and+, CIKM'07, Lisboa, Portugal. Copyright 2007 ACM 978-1-59593-803-9/07/0011,(Nov. 6-8, 2007), 10 pages.

Nodelman, Uri et al., "Continuous Time Bayesian Networks", *Stanford University*, Available at <http://ai.stanford.edu/~nodelman/papers/ctbn.pdf>,(Jun. 10, 2007), 11 pages.

Regelson, Moira et al., "Predicting Click-Through Rate Using Keyword Clusters", *EC '06*, Available at <http://citeseerx.ist.psu.edu/viewdoc/download?doi=10.1.1.130.9999&rep=rep1&type=pdf>,(Jun. 11, 2006), 6 pages.

Schwaighofer, Anton et al., "Scalable Clustering and Keyword Suggestion for Online Advertisements", *ADKDD 2009*, Available at <http://research.microsoft.com/pubs/81021/adClustering.pdf>,(Jun. 28, 2009), 10 pages.

Vickrey, William "Counterspeculation, Auctions, and Competitive Sealed Tenders", Journal of Finance, vol. 16, Issue 1,(Mar. 1961), pp. 8-37.

"Final Office Action", U.S. Appl. No. 13/288,650, Sep. 30, 2013, 14 pages.

"Final Office Action", U.S. Appl. No. 12/748,014, Oct. 10, 2013, 21 pages.

"Advisory Action", U.S. Appl. No. 12/748,014, Jan. 21, 2014, 3 pages.

"Non-Final Office Action", U.S. Appl. No. 13/288,650, Mar. 20, 2014, 13 pages.

"Non-Final Office Action", U.S. Appl. No. 12/748,014, Mar. 21, 2014, 17 pages.

"Advisory Action", U.S. Appl. No. 13/288,650, Jan. 29, 2014, 7 pages.

"Notice of Allowance", U.S. Appl. No. 12/732,031, Jun. 3, 2014, 10 pages.

"Notice of Allowance", U.S. Appl. No. 12/751,533, May 9, 2014, 11 pages.

"Non-Final Office Action", U.S. Appl. No. 12/761,961, Jul. 3, 2014, 13 pages.

"Non-Final Office Action", U.S. Appl. No. 12/757,634, Jun. 19, 2014, 7 pages.

"Non-Final Office Action", U.S. Appl. No. 12/732,031, Aug. 15, 2014, 6 pages.

"Non-Final Office Action", U.S. Appl. No. 12/751,533, Aug. 14, 2014, 6 pages.

"Notice of Allowance", U.S. Appl. No. 12/748,014, Aug. 18, 2014, 4 pages.

"Corrected Notice of Allowance", U.S. Appl. No. 12/748,014, Nov. 28, 2014, 2 pages.

"Non-Final Office Action", U.S. Appl. No. 12/757,634, Nov. 24, 2014, 7 pages.

"Non-Final Office Action", U.S. Appl. No. 13/288,650, Oct. 24, 2014, 16 pages.

* cited by examiner

OFFLINE RESOURCE ALLOCATION ALGORITHMS

RELATED APPLICATION

This application is a continuation-in-part of and claims priority under 35 U.S.C. §120 to U.S. patent application Ser. No. 13/288,650, filed on Nov. 3, 2011 and titled "Online Resource Allocation Algorithms," the disclosure of which is incorporated by reference in its entirety herein.

BACKGROUND

Resource allocation problems that involve matching of resources available from a service provider to a set of requests from clients for the resources can arise in a variety of different contexts. One example resource allocation problem arises in Internet advertising scenarios, where advertisers may request/buy space for display ads (e.g., graphical "banner" ads) to be shown to users in conjunction with web-pages available from service providers. The service providers may be compensated an amount for each web-page impression (e.g., user view of a page) for which an advertisement is shown. Display ads are typically sold with guaranteed impression goals. In this scenario, the service provider sells orders for a fixed number of impressions and is responsible for making sure that the goals for the orders are met. In this context, the service provider may be concerned with matching of various requests to impressions in a manner that increases revenue and fulfills all the orders.

Matching for the example Internet advertising scenario and other comparable resource allocation problems, though, can become quite difficult as the number of requests to be matched becomes larger due to the number of computations involved in performing the matching. Traditional algorithms suitable to perform matching with relatively small data sets may be unable to successfully perform matching for larger data sets that arise in some scenarios.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide offline algorithms for resource allocation. In one or more embodiments, requests for resources from a service provider are received in advance and processed "offline" to match a known set of requests to available resources. In one approach, the set of requests and resources are processed using an online algorithm that models the offline resource allocation problem as though the requests were received stochastically. A database of requests and resources may be scaled according to a scaling factor to simplify the analysis. Requests are then sampled from the database randomly and provided as input to an online resource allocation algorithm. For each request, resources are allocated to the request by evaluating multiple options based in part upon shadow costs (e.g., unit costs) that are assigned to resources associated with the different options. After each request is processed, an adjustment is made to the shadow costs for remaining resources to reflect differences in rates for allocation and/or consumption of the resources and updated shadow costs are used for a subsequent request. A scaled resource allocation determined using sampled requests in this manner may be scaled back up to output a solution for the offline resource allocation problem.

DETAILED DESCRIPTION

Overview

Various embodiments provide offline algorithms for resource allocation. In one or more embodiments, requests for resources from a service provider are received in advance and processed "offline" to match a known set of requests to available resources. In one approach, the set of requests and resources are processed using an online algorithm that models the offline resource allocation problem as though the requests were received stochastically. A database of requests and resources may be scaled according to a scaling factor to simplify the analysis. Requests are then sampled from the database randomly and provided as input to an online resource allocation algorithm. For each request, resources are allocated to the request by evaluating multiple options based in part upon shadow costs (e.g., unit costs) that are assigned to resources associated with the different options. After each request is processed, an adjustment is made to the shadow costs for remaining resources to reflect differences in rates for allocation and/or consumption of the resources and updated shadow costs are used for a subsequent request. A scaled resource allocation determined using sampled requests in this manner may be scaled back up to output a solution for the offline resource allocation problem.

In the discussion that follows, a section titled "Operating Environment" describes but one environment in which the various embodiments can be employed. Following this, a section titled "Online Resource Allocation Algorithm Procedures" describes example procedures for online algorithms that may be employed for offline problems. Next, a section titled "Online Resource Allocation Algorithm Implementation Details" describes additional details for online algorithms in accordance with one or more embodiments. After this, a section titled "Offline Resource Allocation Algorithms" describes details regarding techniques for offline resource allocation algorithms in the context of the preceding discussion of online algorithms. Last, a section titled "Example System" is provided and describes an example system that can be used to implement one or more embodiments.

Operating Environment

Figure 1:
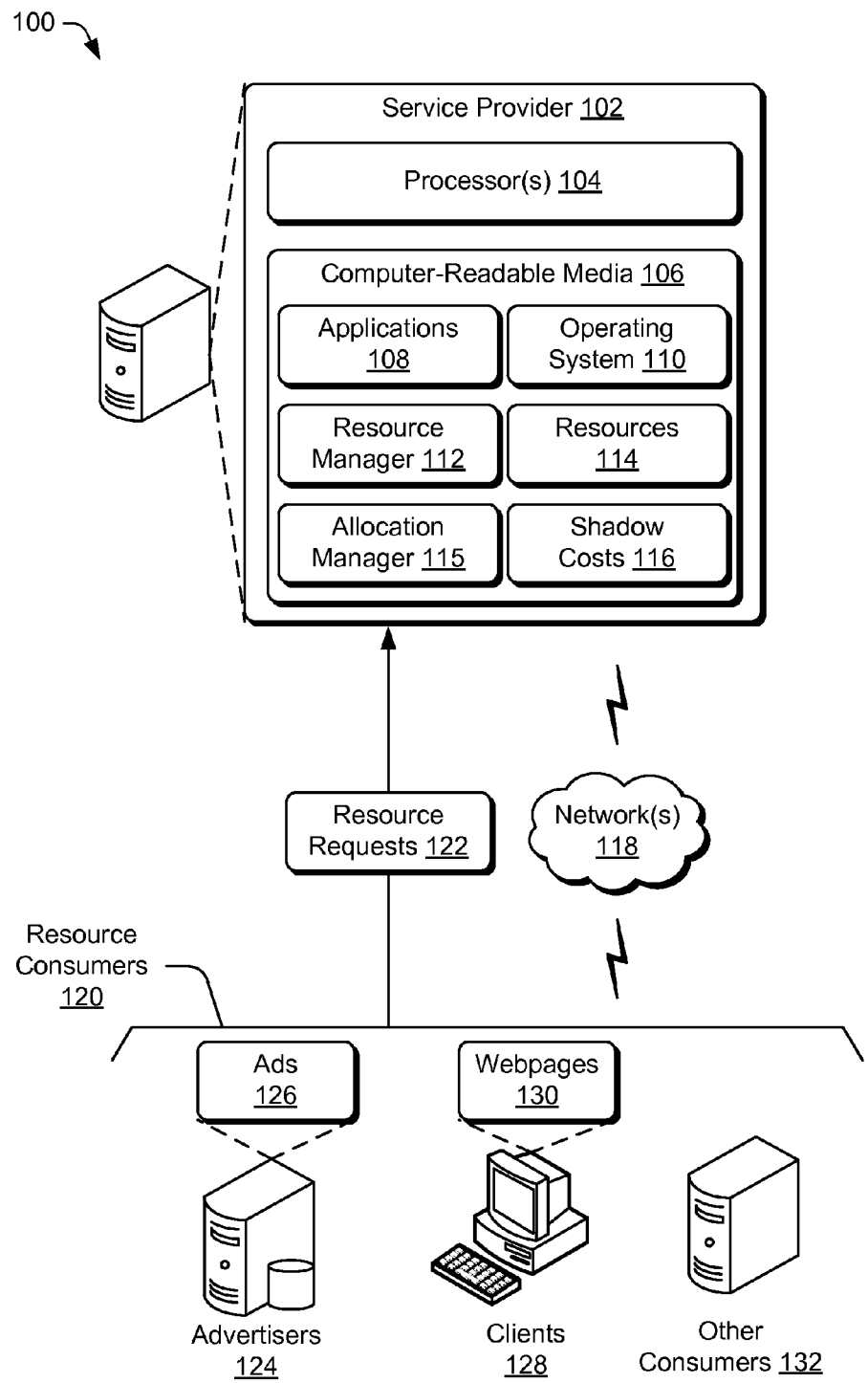
FIG. 1 illustrates an example operating environment in which one or more embodiments of resource allocation algorithms can be employed.

FIG. 1 illustrates an operating environment in accordance with one or more embodiments, generally at 100. The environment 100 includes a service provider 102 having one or more processors 104, one or more computer-readable media 106 and one or more applications 108 that are stored on the computer-readable media and which are executable by the one or more processors 104. The service provider 102 can be embodied as any suitable computing device or combination of devices such as, by way of example and not limitation, one or more servers, a server farm, a peer-to-peer network of devices, a desktop computer, and the like. One example of a computing system that may represent various systems and/or devices including the service provider 102 is shown and described below in relation to FIG. 8.

The computer-readable media may include, by way of example and not limitation, forms of volatile and non-volatile memory and/or storage media that are typically associated with a computing device. Such media may include ROM, RAM, flash memory, hard disk, removable media and the like. One such configuration of a computer-readable media is signal bearing "communication media" that is configured to transmit computer-readable instructions (e.g., as a carrier wave) to the hardware of the computing device, such as via a network. The computer-readable medium may also be configured as "computer-readable storage media" that excludes mere signal transmission and/or signals per se. Thus, computer-readable media includes both "computer-readable storage media" and "communication media" further examples of which can also be found in the discussion of the example computing system of FIG. 8.

Computer-readable media 106 is also depicted as storing an operating system 110, a resource manager 112, resources 114 (e.g., content, services, and data), and an allocation manager 115 that may also be executable by the processor(s) 104. While illustrated separately, the allocation manager 115 may also be implemented as a component of the resource manager 112. Generally speaking, the resource manager 112 represents functionality operable by the service provider 102 to manage various resources 114 that may be made available over a network. The resource manager 112 may manage access to the resources 114, performance of the resources 114, configuration of user interfaces or data to provide the resources 114, and so on.

To determine how to allocate the resources 114, the resource manager 112 may include or otherwise make use of an allocation manager 115. The allocation manager 115 represents functionality to implement various online and offline algorithms for resource allocation described herein. In at least some embodiments, the allocation manager is configured to manage and use shadow costs 116 associated with various resources 114 to evaluate resource allocation options and pick an appropriate option to service resource requests. The shadow costs 116 may be configured as computed or estimated costs that are assigned on an individual basis to different resources. In at least some embodiments the shadow costs 116 are unit costs for a designated quantity of corresponding resources 114.

Thus, the allocation manager 115 may perform various operations to ascertain optimal allocation solutions for resource requests including, but not limited to, assigning shadow costs 116 to the resources, computing profit/revenue values for multiple allocation options, picking an optimal option using an objective function, and iteratively updating the shadow costs 116 as resources are consumed to reflect different rates of consumption for different resources. These and other aspects of resource allocation techniques are described in greater detail below in relation to the following example procedures. The allocation manager 115 may also be configured to apply an online algorithm to evaluate an offline resource allocation problem. This may involve scaling and/or sampling a known set of request to simulate an online problem from a set of offline requests as described in detail below.

As further depicted in FIG. 1, the service provider 102 can be communicatively coupled over a network 118 to various other entities (e.g., devices, servers, storage locations, clients, users, and so forth) that may interact with the service provider 102 to take advantage of resources 114 made available by the service provider 102. Although the network 118 is illustrated as the Internet, the network may assume a wide variety of configurations. For example, the network 118 may include a wide area network (WAN), a local area network (LAN), a wireless network, a public telephone network, an intranet, and so on. Further, although a single network 118 is shown, the network 118 may be configured to include multiple networks.

In particular, the service provider 102 is illustrated as being connected over the network 118 to resource consumers 120 that may submit resource requests 122 to access the resources 114. For example, resources consumers 120 may form resource requests 122 for communication to the service provider 102 to obtain corresponding resources 114. In response to receiving such requests, the service provider 102 can process the requests via the resource manager 112 and/or allocation manager 115 and provide various resources 114. Various different kinds of resource consumers 120 are contemplated, which by way of example and not limitation are depicted in FIG. 1 as including advertisers 124 that may provide advertisements 126 for placement in connection with resources 114, clients 128 that may access and make use of resources 114 through webpages 130 or otherwise, and other consumers 132 such as business entities, third-party partner sites, and the like.

Resources 114 can include any suitable combination of content and/or services typically made available over a network by one or more service providers. For instance, content can include various combinations of text, video, ads, audio, multi-media streams, animations, images, and the like. Some examples of services include, but are not limited to, online computing services (e.g., "cloud" computing), web-based applications, a file storage and collaboration service, a search service, messaging services such as email and/or instant messaging for sending messages between different entities, and a social networking service to facilitate connections and interactions between groups of users who share common interests and activities. Services may also include an advertisement service configured to enable advertisers 124 to purchase advertising space and/or place advertisements 126 for presentation to clients in conjunction with the resources 114.

Having considered an example operating environment, consider now a discussion of example resource allocation algorithm procedures in accordance with one or more embodiments.

Online Resource Allocation Algorithm Procedures

The following discussion describes procedures involving online resource allocation algorithms that may be implemented utilizing the environment, systems, and/or devices described above and below. Such online algorithms may be employed as subroutines in an offline setting as described below. Aspects of each of the procedures below may be implemented in hardware, firmware, software, or a combination thereof. The following procedures are shown as a set of blocks that specify operations performed by one or more devices and are not necessarily limited to the orders shown for performing the operations by the respective blocks. In portions of the following discussion, reference may be made to the example environment 100 of FIG. 1.

Figure 2:
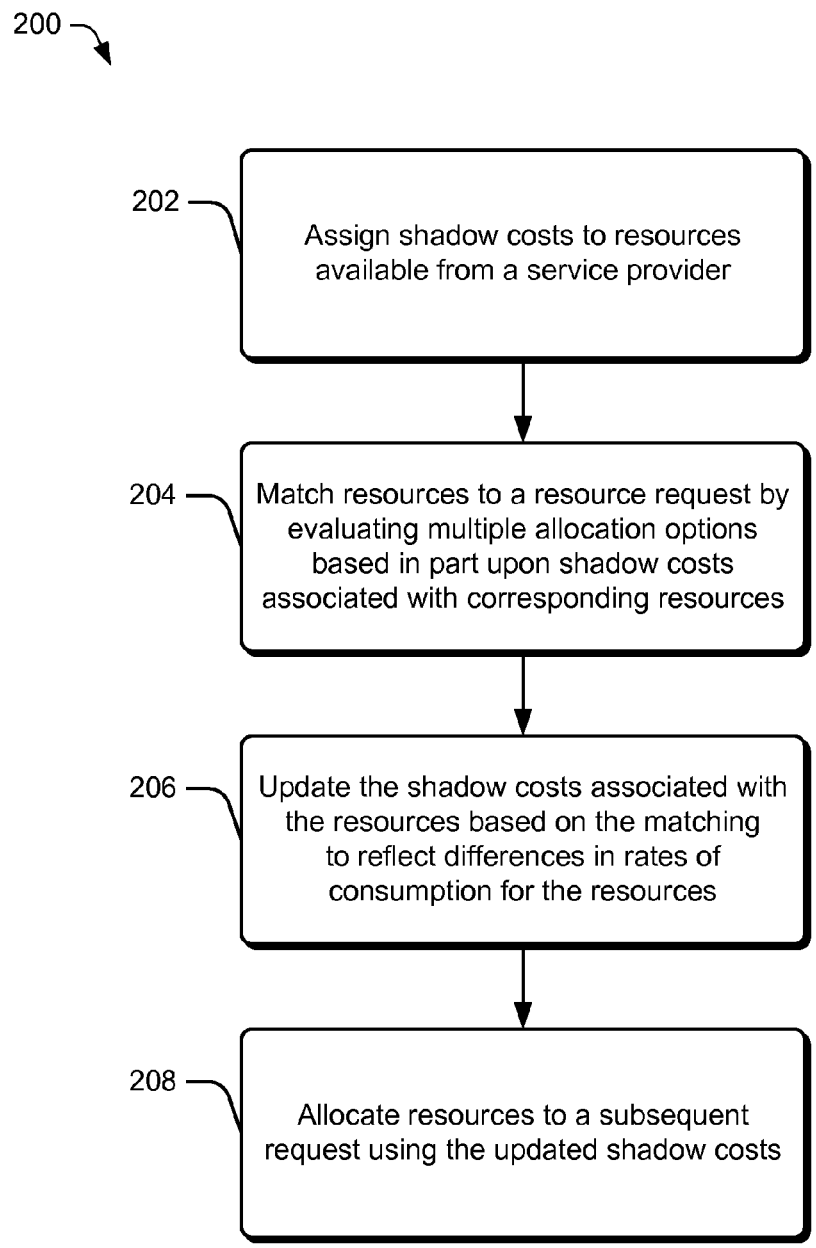
FIG. 2 is a flow diagram that describes an example procedure in accordance with one or more embodiments.

FIG. 2 is a flow diagram that describes an example procedure 200 for online resource allocation in accordance with one or more embodiments. In at least some embodiments, the procedure 200 can be performed by a suitably configured computing device, such as a service provider 102 of FIG. 1, or other computing device having an allocation manager 115 and/or resource manager 112.

Shadow costs are assigned to resources available from a service provider (block 202). For example, an allocation manager 115 may operate to ascertain and assign shadow costs 116 to resources 114 as mentioned previously. The shadow costs for a particular resource may represent unit costs (e.g. price per quantity of resource) that can be used to compute a total cost for a requested amount of the particular resource. In at least some embodiments, the shadow costs may be computed and assigned initially as an estimate. In one approach, an initial sampling of resource requests can be employed to compute an initial estimate of the shadow cost for a corresponding resource. In addition or alternatively, the initial shadow cost may also be computed offline through analysis of historical data. Combinations of the foregoing approaches are also contemplated.

Resources are matched to a resource request by evaluating multiple allocation options based in part upon shadow costs associated with corresponding resources (block 204). Here, the allocation manager 115 may operate to determine an optimal allocation solution for a particular resource request 122 using the assigned shadow costs. A given request may specify requested quantities and/or prices to be paid for one or more requested resources. The allocation manager 115 may test one or more allocation options having different combinations of available resources to find a "best option." To do so, the allocation manager 115 applies a resource allocation algorithm that is based at least in part upon the shadow costs, some examples of which are described herein. Generally, speaking the allocation manager 115 may apply an algorithm to evaluate an objective function that encodes a computational objective (e.g., the goal) for the allocation of the resources. For example, the objective function may be configured to maximize revenue or profit that is computed using the shadow costs for different resources. By testing multiple different allocation options (e.g., combinations of available resources), the allocation manager 115 can select an appropriate option that optimizes the objective function and can match corresponding resources to the resource request. Further details regarding objective functions and resource allocation algorithms that may be employed are discussed in relation to the following figures.

Shadow costs associated with the resources are updated based on the matching to reflect differences in rates of consumption for the resources (block 206) and resources are allocated to a subsequent request using the updated shadow costs (block 208). As discussed in greater detail below, the allocation manager 115 may iteratively adjust shadow costs on an ongoing basis to obtain an increasingly more accurate value for the shadow costs. Thus, after resources are allocated to a particular request, shadow costs are adjusted to reflect rates at which different resources are being consumed. For different sources of a resource that are fungible with respect to one another, cost is generally increased for a particular source as the rate of consumption of the resource from the source is increased. Likewise, the shadow cost may be decreased for sources that are unused or under-utilized. Effectively, the shadow costs act as priority values that can be used to distribute resource allocation efficiently among various options/sources for the resources by setting the relative cost of resources one to another. As a particular resource becomes scarcer, the cost is increased and accordingly it may become more favorable to select a different resource to service a current request. On the other hand, an under-utilized resource will be associated with a relatively lower cost and therefore becomes a more attractive option to service a request. Shadow costs that are updated in the preceding manner may then be used for handling a subsequent request and the process may repeat, such that updated costs are determined and employed iteratively to allocate resources to each request that is received by a service provider 102 using shadow costs computed by evaluating previous requests.

Figure 3:
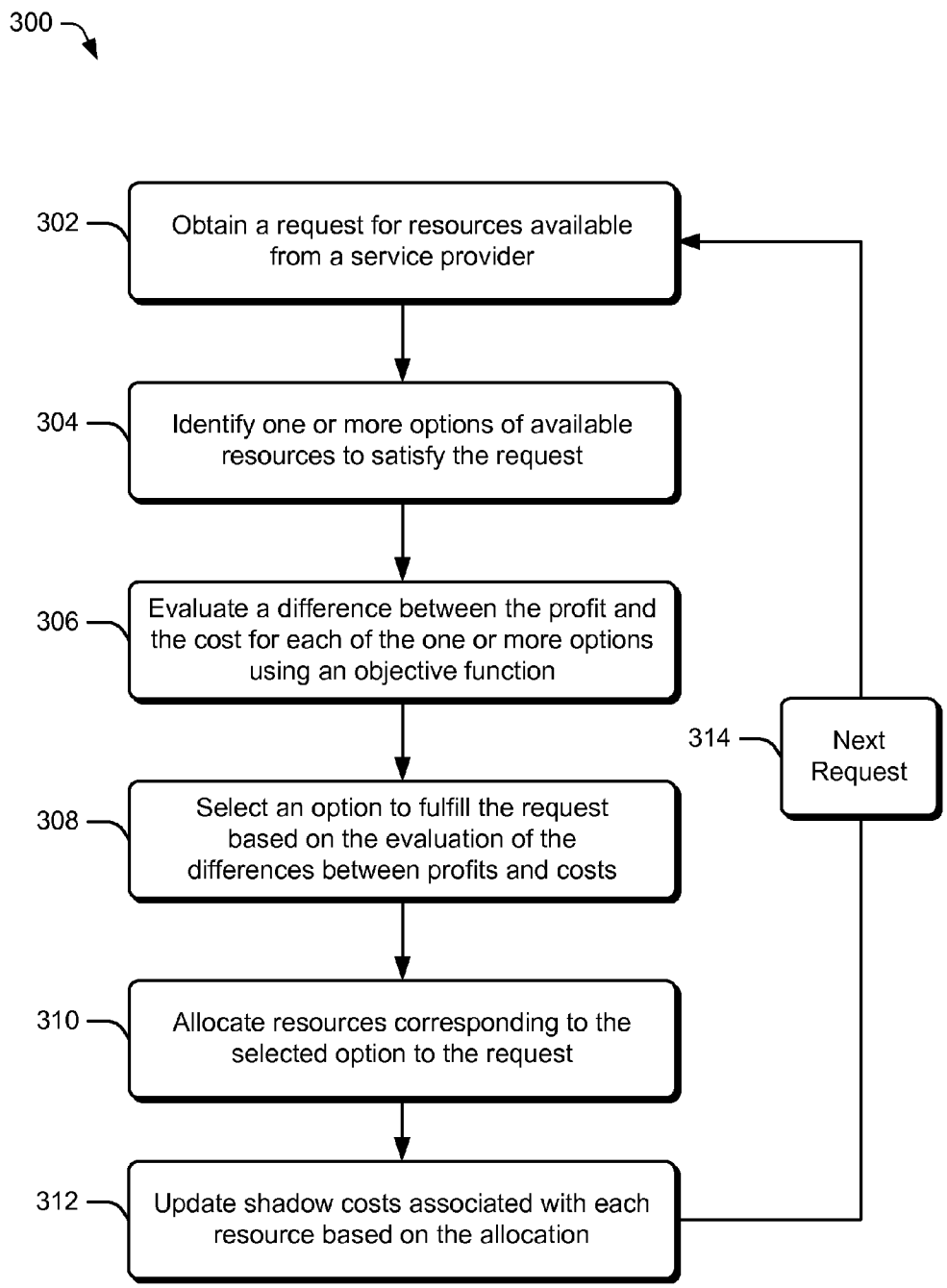
FIG. 3 is a flow diagram that describes details of an example online resource allocation algorithm in accordance with one or more embodiments.

FIG. 3 is a flow diagram that describes another example procedure 300 for online resource allocation in accordance with one or more embodiments. A request for resources available from a service provider is obtained (block 302). For instance, a resource consumer 120 may submit a resource request 122 to a service provider 102. The service provider 102 may be configured to handle the request and allocate resources to the request using an allocation manager 115 and/or resource manager 112. The request may specify one or more different kinds of resources 114 and requested quantities, such as ad space (e.g. impressions), online computing resources, webpages, load balancing parameters, message routing criteria, storage or processing capacity, account access, and so forth. A request may also include or otherwise be associated with a price to be paid for the corresponding resources 114. The price reflects the value of the request to the provider, e.g., potential revenue/profit. The allocation manager 115 may operate to determine and select particular sources of requested resources such as selecting particular servers in a server farm, distribution of goods in an auction setting, webpages having ad space (e.g., available impressions), load balancing between servers, or message routing paths in different allocation scenarios, to name a few examples.

In particular, one or more options of available resources are identified to satisfy the request (block 304). For instance, given the resources and quantities specified by a request (e.g., the request constraints), the allocation manager 115 may identify one or more combinations of resources that are available to serve the request based on resource constraints such as amount of resources available, resource prices, time/date constraints, and so forth. In other words, given particular request constraints and resource constraints, the allocation manager 115 may develop one or more options to be evaluated by matching of the request constraints with resources 114 having the resource constraints, such that the request constraints and resource constraints are both satisfied.

A difference is evaluated between the profit and cost for each of the one or more options using an objective function (block 306). For example, total cost for an option may be computed by summing the shadow costs time quantity for each resource involved in the option. The total cost may then be subtracted from a profit value that corresponds to the option. The profit value as used herein represents an appropriate measurement of the value of a corresponding option. The profit value may be computed in various ways such as revenue generated by the option, total price paid for the option, gross profit, operating profit or other suitable measurements of value for an option. Thus, an objective function in various forms may be configured to compute a difference value between a selected profit value and cost value. One particular example objective function is discussed below in relation to FIG. 4 and additional details regarding suitable algorithms and objective functions are described in a section below titled "Online Resource Allocation Algorithm Implementation Details."

An option is selected to allocate to the request based on the evaluation of the differences between profits and costs (block 308). In one example, an option that maximizes the profit or revenue is selected. This may be computed as the maximum of profit minus cost or conversely as the minimum of cost minus profit.

Resources corresponding to the selected option are allocated to the request (block 310). The particular resources 114 corresponding to the selected option may be provided to or reserved for the resource consumer 120 that submitted the request. The resources 114 that are consumed are then taken out of the pool of available resources. Note that an amount of a particular resource consumed by a given request may be the full or partial quantity/capacity of the resource. Thus, a particular resource may be used completely for one request or divided across multiple requests in different scenarios.

Shadow costs associated with each resource are updated based on the allocation (block 312). The shadow costs may be updated in the manner previously described to account for rates of consumption of different resources and/or remaining quantities/capacities of resources available from different sources. Thus, if 50% of the impressions for a given webpage are allocated to an ad request, the shadow cost of the remaining 50% of the impressions may be increased to account for the partial consumption of the resource. Additionally or alternatively, the shadow cost for impressions of another page that were not allocated to the ad request may be reduced accordingly relative to other impression sources.

A next request is received (block 314) and the process just described may be repeated (e.g., repeat block 302 to block 312), this time using the updated shadow costs for the allocation. In this way, shadow costs may be iteratively used and updated to allocate resources successively to online requests for resources 114 from a service provider 102.

Figure 4:
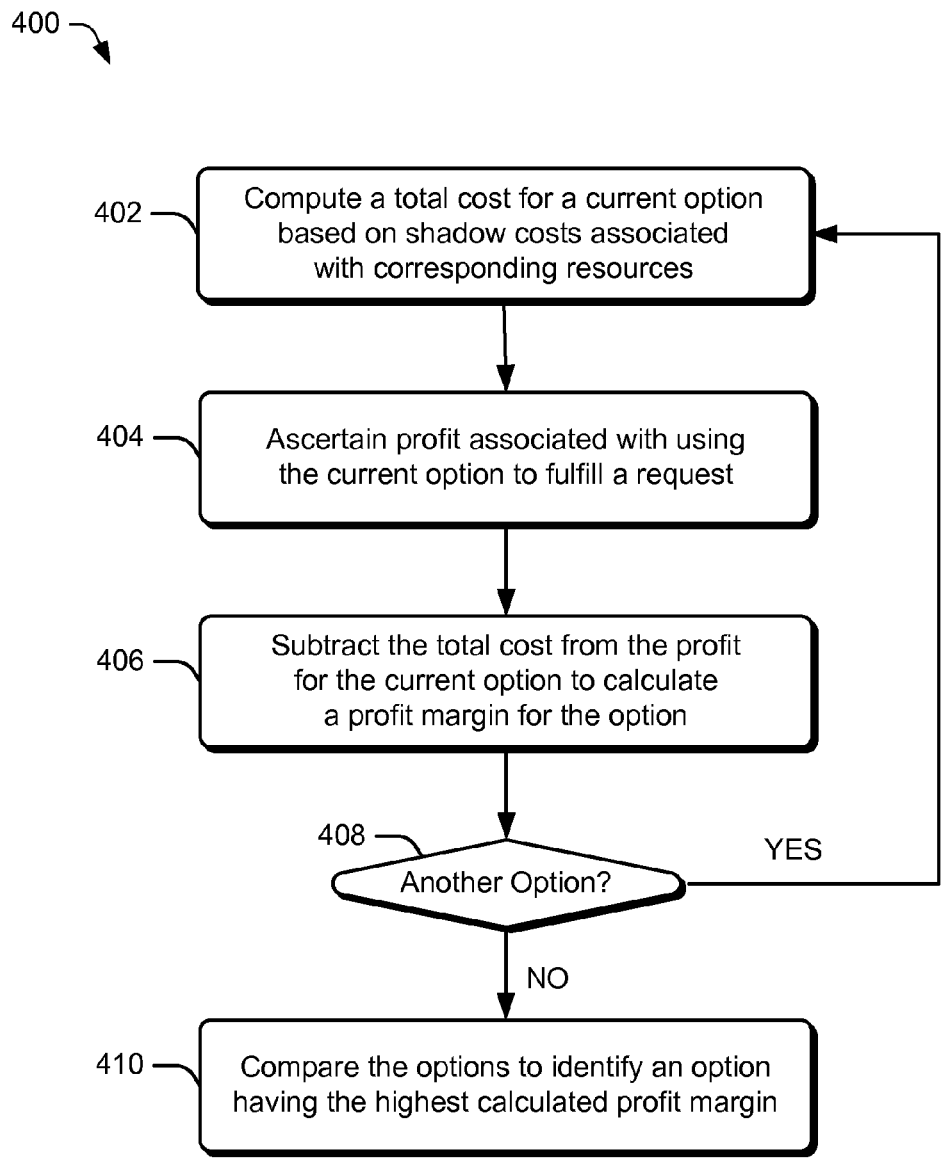
FIG. 4 is a flow diagram that describes details of an example objective function in accordance with one or more embodiments.

FIG. 4 is a flow diagram that describes a procedure 400 for an example objective function that may be incorporated within an online resource allocation algorithm in accordance with one or more embodiments. For instance, the example objective function may be used in connection with the matching of block 204 of procedure 200 and/or the evaluation of block 306 in procedure 300.

A total cost for a current option is computed based upon shadow costs associated with corresponding resources (block 402). The total cost may be computed by summing the quantity of resource requested times respective shadow costs for each resource associated with an option as discussed earlier. If an option/request includes just one resource, the total cost will be the total cost for the one resource (e.g., shadow cost times quantity). In cases where multiple resources are involved, the total cost is the sum of the individual costs for the multiple resources.

Profit associated with using the current option to fulfill the request is ascertained (block 404). A suitable profit value associated with an option may be computed as previously discussed in relation to FIG. 3. Thereafter, the total cost is subtracted from the profit for the current option to calculate a profit margin for the option (block 406). Here, the allocation manager 115 may compute a profit margin as a difference between profit and cost.

A determination in made regarding whether there is another option to be evaluated (block 408). As long as additional options to be evaluated exist, the process just described (e.g., block 402 to block 408) repeats for the next option to compute a profit margin for each available option. When each option has been evaluated, the options are compared to identify an option having the highest calculated profit margin (block 410). Naturally, profit values may be compared on an ongoing basis as the values are calculated with the highest value being selected (e.g., surviving) after each one on one comparison. Additionally or alternatively, values may be computed for each option first and then the highest value or otherwise optimal value (e.g., max of profit minus cost or min of cost minus profit) is ascertained. This option may then be selected to service the current request. In addition, shadow costs may be updated as noted previously and subsequently a request may be handled using the updated shadow costs.

Having described example procedures involving online resource allocation algorithms, consider now specific implementation examples that can be employed with one or more embodiments described herein.

Online Resource Allocation Algorithm Implementation Details

Consider now a discussion of example algorithms and implementations that may be employed using the previously described devices and systems. Additional proofs and details regarding resource allocation algorithms and techniques described herein can be found in "Near Optimal Online Algorithms and Fast Approximation Algorithms for Resource Allocation Problems" by Nikhil Devanur, Kamal Jain, Balasubramanian Sivan, Chris Wilkens, In the 12th ACM Conference on Electronic Commerce, EC (2011), which is incorporated by reference herein in its entirety.

In particular, a resource allocation framework is first described. After this, applications of the described techniques to "adwords" problems involving allocation of impressions to advertisers are introduced. Then, a simplified "min-max" version of the resource allocation framework is discussed. Thereafter, a competitive online algorithm for the resource allocation framework with stochastic input is described.

Resource Allocation Framework

Consider the following framework of optimization problems. There are n resources, with resource i having a capacity of $c_i$. There are m requests and each request j can be satisfied by a vector $x_j$ that is constrained to be in a polytope $P_j$ (the vector $x_j$ is referred to as an option to satisfy a request, and the polytope $P_j$ is referred to as the set of options.) The vector $x_j$ consumes $a_{i,j} \cdot x_j$ amount of resource i, and gives a profit of $w_j \cdot x_j$. Note that $a_{i,j}$, $w_j$ and $x_j$ are all vectors. The objective is to maximize the total profit subject to the capacity constraints on the resources. The following liner program (LP) describes the problem:

$$\max \sum_j w_j \cdot x_j \text{ such that (s.t.)}$$

$$\forall i: \sum_j a_{ij} \cdot x_j \leq c_i$$

$$\forall j: x_j \in \{P_j\}$$

Assume there is an oracle available that given a request j and a vector v, returns the vector $x_j$ that maximizes $v \cdot x_j$ among all vectors in $P_j$. Let $$\gamma = \max\left(\left\{\frac{a_{ij} \cdot x_j}{c_i}\right\}_{i,j} \cup \left\{\frac{w_j \cdot x_j}{W^*}\right\}_j\right),$$

which in the case of the "Adwords" examples herein corresponds to the bid to budget ratio. Here W* is the optimal offline objective to the distribution instance, that is defined below.

The canonical case is where each $P_j$ is a unit simplex in $R^K$, i.e., $P_j = \{x_j \in R^K : \Sigma_k x_{j,k} \leq 1\}$. This captures the case where there are K discrete options, each with a given profit and consumption, which encompasses most of the interesting applications such as those described below. The co-ordinates of the vectors $a_{i,j}$ and $w_j$ are denoted by a(i, j, k) and $w_{j,k}$ respectively, i.e., the kth option consumes a(i, j, k) amount of resource i and gives a profit of $w_{j,k}$.

Online Algorithms with Stochastic Input

Consider now an online version of the resource allocation framework. Here requests arrive online, e.g., in random order one at a time. In particular, consider the i.i.d. (independent and identically distributed) model, where each request is drawn independently from a given distribution. The distribution is unknown to the algorithm. The algorithm knows m, the total number of requests. The competitive ratios established for resource allocation problems with bounded γ are with respect to an upper bound on the expected value of fractional optimal solution, namely, the fractional optimal solution of the distribution instance, defined below.

Consider the following distribution instance of the problem. It is an offline instance defined for any given distribution over requests and the total number of requests m. The capacities of the resources $c_i$ in this instance are the same as in the original instance. Every request in the support of the distribution is also a request in this instance. Suppose request j occurs with probability $p_j$. The resource consumption of j in the distribution instance is given by $mp_j a_{i,j}$ for all i and the profit is $mp_j w_j$. The intuition is that if the requests were drawn from this distribution then the expected number of times request j is seen is $mp_j$ and this is represented in the distribution instance by scaling the consumption and the profit vectors by $mp_j$. To summarize, the distribution instance is as follows:

$$\text{maximize} \sum_{j \text{ in the support}} mp_j w_j \cdot x_j \text{ s.t.}$$

$$\forall i: \sum_j mp_j a_{ij} \cdot x_j \leq c_i$$

$$\forall j: x_j \in P_j$$

It may be shown that the fractional optimal solution to the distribution instance is an upper bound on the expectation of OPT, where OPT is the offline fractional optimum of the actual sequence of requests. This is expressed in the following lemma:

Lemma: OPT[Distribution Instance]≥E [OPT]

The average of optimal solutions for all possible sequences of requests may give a feasible solution to the distribution instance with a profit equal to E[OPT]. Thus, the optimal profit for the distribution instance could only be larger.

The competitive ratio of an algorithm in the i.i.d model is defined as the ratio of the expected profit of the algorithm to the fractional optimal profit for the distribution instance. The main result is that as γ tends to zero, the competitive ratio tends to 1. This is in fact approximately the optimal trade-off. In other words, the ratio of the actual profit attained to the maximum profit available (which may be computed after the fact) is very close to 1. This is reflected by the following theorems.

Theorem 2: For any ε>0, an algorithm exists such that if $$\gamma = O\left(\frac{\epsilon^2}{\log\left(\frac{n}{\epsilon}\right)}\right)$$

then the competitive ratio of the algorithm is 1−O(ε).

Theorem 3: There exist instances with $$\gamma = \frac{\epsilon^2}{\log(n)}$$

such that no algorithm can get a competitive ratio of 1−o(ε).

Also, the example algorithm(s) described herein works when the polytope $P_j$ is obtained as an LP relaxation of the actual problem. To be precise, suppose that the set of options that could be used to satisfy a given request corresponds to some set of vectors say $I_j$. Let the polytope $P_j \supseteq I_j$ be an approximate relaxation of $I_j$ if for the profit vector $w_j$ and for all $x_j \in P_j$, there is an oracle that returns a $y_j \in I_j$ such that $w_j \cdot y_j \geq \alpha w_j \cdot x_j$ and, for all i, $a_{ij} \cdot y_j \leq a_{ij} \cdot x_j$. Given such an oracle, the algorithm achieves a competitive ratio of α−O(ε), which can be stated as follows:

Theorem 4: Given a resource allocation problem with an approximate relaxation, and for any ε>0 an algorithm exists such that if $$\gamma = O\left(\frac{\epsilon^2}{\log\left(\frac{n}{\epsilon}\right)}\right)$$

then the competitive ratio of the algorithm is α−O(ε).

Consider the problem in the resource allocation framework defined by the relaxation, that is request j can actually be satisfied by the polytope $P_j$. The optimal solution to the relaxation is an upper bound on the optimal solution to the original problem. Now run the online algorithm described below on the relaxation, and when the algorithm picks a vector $x_j$ to serve request j, use the rounding oracle to round it to a solution $y_j$ and use this solution. Since the sequence of $x_j$'s picked by the algorithm are within 1−O(ε) of the optimum for the relaxation, and for all j, $w_j \cdot y_j \geq \alpha w_j \cdot x_j$ this algorithm is α(1−O(ε)) competitive.

In fact, these results hold for the following more general model, the adversarial stochastic input model. In each step, the adversary adaptively chooses a distribution from which the request in that step is drawn. The adversary is constrained to pick the distributions in one of the following two ways. In the first case, assume that a target objective value $OPT_T$ is given to the algorithm, and that the adversary is constrained to pick distributions such that the fractional optimum solution of each of the corresponding distribution instances is at least $OPT_T$ (or at most $OPT_T$ for minimization problems). The competitive ratio is defined with respect to $OPT_T$. In the second case, the target is not given, but the adversary is constrained to pick distributions so that the fractional optimum of each of the corresponding distribution instances is the same, which is the benchmark with respect to which the competitive ratio is defined. Note that while the i.i.d model can be reduced to the random permutation model, these generalizations are incomparable to the random permutation model as they allow the input to vary over time. Also the constraint that each of the distribution instances has a large optimum value distinguishes this from the worst-case model. This constraint in general implies that the distribution contains sufficiently rich variety of requests in order for the corresponding distribution instance to have a high optimum. To truly simulate the worst-case model, in every step the adversary would chose a "deterministic distribution", that is a distribution supported on a single request. Then the distribution instance will simply have m copies of this single request and hence will not have a high optimum. For instance, consider online bipartite b-matching where each resource is a node on one side of a bipartite graph with the capacity $c_i$ denoting the number of nodes it can be matched to and the requests are nodes on the other side of the graph and can be matched to at most one node. A deterministic distribution in this case corresponds to a single online node and if that node is repeated m times then the optimum for that instance is just the weighted (by $c_i$) degree of that node. If the adversary only picks such deterministic distributions then the adversary is constrained to pick nodes of very high degree thus making it easy for the algorithm to match them.

The "Adwords" Problem

In the i.i.d Adwords problem, there are n bidders, and each bidder i has a daily budget of $B_i$ dollars. Keywords arrive online with keyword j having an (unknown) probability $p_j$ of arriving in any given step. For every keyword j, each bidder submits a bid, $b_{ij}$, which is the profit obtained by the algorithm on allocating keyword j to bidder i. The objective is to maximize the profit, subject to the constraint that no bidder is charged more than his budget. Here, the resources are the daily budgets of the bidders, the requests are the keywords, and the options are once again the bidders. The amount of resource consumed and the profit are both $b_{ij}$.

Min-Max Algorithm

Given the foregoing, consider now a slightly simplified version of the general online resource allocation problem, which is referred to as the min-max problem. In this problem, m requests arrive online, and each of them is served. As a simplification, there is no profit to consider. The objective is to minimize the maximum fraction of any resource consumed. The following LP describes the problem.

$$\text{minimize } \lambda \text{ s.t.}$$

$$\forall i, \sum_{j,k} a(i,j,k) x_{j,k} \leq \lambda c_i$$

$$\forall j, \sum_k x_{j,k} = 1$$

$$\forall j, k, x_{j,k} \geq 0$$

Here, $\lambda$, is the maximum fraction of a resource that is consumed. Assume that the requests arrive according to the i.i.d model (e.g., an unknown distribution) and the algorithm proceeds in steps. Let $\lambda^*$ denote the fractional optimal objective value of the distribution instance of this problem. Let $X_i^t$ be a random variable indicating the amount of resource i consumed during step t, that is, $X_i^t = a(i,j,k)$ if in step t, request j was chosen and was served using option k. Let $S_i^T = \sum_{t=1}^T X_i^t$ be the total amount of resource i consumed in the first T steps. Let $$\gamma = \max_{i,j,k} \left\{ \frac{a(i,j,k)}{c_i} \right\},$$

which implies that for all i, j and k, $a(i,j,k) \leq \gamma c_i$. Let $\phi_i^t = (1+\epsilon)^{S_i^t/\gamma c_i}$. For the sake of convenience, let $S_i^0 = 1$ and $\phi_i^0 = 0$ for all i. The resulting algorithm for the min-max problem just defined is as follows:

ALG Min-max: In step t+1, on receiving request j, use option:

$$\text{argmin}_k \left\{ \sum_i \frac{a(i,j,k)\phi_i^t}{c_i} \right\}.$$

Lemma: For any $\epsilon \in [0, 1]$, the algorithm ALG Min-max described above approximates $\lambda^*$ within a factor of $(1+\epsilon)$ with a probability at least $1-\delta$, where $$\delta = n \cdot \exp\left(\frac{-\epsilon^2 \lambda^*}{4\gamma}\right).$$

In the above min-max algorithm, a(i,j,k) represents the amount of a particular resource i that is consumed if option k is used for a request j and $\phi_i^t$ represents the shadow cost 116 associated with that resource i at time t. In this case $\phi_i^t$ is the total cost for the resource and $c_i$ is the total capacity of the resource. Accordingly, the unit cost is $\phi_i^t/c_i$. Note that the shadow cost 116 at time t is set as a function of the amount of resource already consumed $S_i^t$ using tuning parameters $\epsilon$ and $\gamma$ (e.g., $\phi_i^t = (1+\epsilon)^{S_i^t/\gamma c_i}$). The tuning parameters may be globally set to enable selective adjustments to be made to the algorithm. The fraction $$\frac{a(i,j,k)\phi_i^t}{c_i}$$

therefore represents the total cost of using option k to serve the request j. This fractional evaluation may be considered the objective function that is optimized by the example min-max algorithm. Accordingly, the min-max algorithm operates to return/select an option using the objective function (based on shadow costs) that minimizes the maximum fraction of any resources consumed for the selected option.

Online Algorithm with Stochastic Input

In this section, a suitable algorithm for the general resource allocation problem with profit being considered is described. Generally speaking the algorithm makes use of an objective function that evaluates a difference between profits and cost as discussed in relation to the example procedures of FIGS. 2-4 above. Once again, the general resource allocation problem can be expressed as an LP as follows:

$$\text{maximize } \sum_{j,k} w_{j,k} x_{j,k} \text{ s.t.}$$

$$\forall i, \sum_{j,k} a(i,j,k) x_{j,k} \leq c_i$$

$$\forall j, \sum_k x_{j,k} \leq 1$$

$$\forall j, k, x_{j,k} \geq 0$$

The LP is constructed to maximize the profit $w_{j,k}$. The following example algorithm solves the LP and computes increasingly more accurate estimates of the objective value by computing the optimal solution for the observed requests, and using it to guide future allocations. The algorithm achieves a competitive ratio of $1-O(\epsilon)$. In this example, the number of requests m is known in advance. The example algorithm is described in table 1 just below:

TABLE 1

Algorithm for stochastic online resource allocation

1: Initialize $t_0$:$t_0 \leftarrow [\epsilon m]$
2: for r = 0 to l − 1 do
3:    for t = $t_r$ + 1 to $t_{r+1}$ do
4:       if t = $t_r$ + 1 then
5:          If the incoming request is j, use the following option k:

$$\arg\min_k \left\{ \frac{\epsilon_c(r)/\gamma}{\left(1+\frac{\epsilon_c(r)}{\gamma m}\right)} \Sigma \phi_i^{init}(r) \frac{a(i,j,k)}{c_i} - \frac{\epsilon_0(r)/w_{max}}{\left(1-\frac{\epsilon_0(r)Z(r)}{w_{max}m}\right)} \phi_{obj}^{init}(r) w_{j,k} \right\}$$

6:       For all i, $S_i^t(r) = X_i^t$, and $V^t(r) = Y^t$,
7:       else
8:          If the incoming request is j, use the following option k:

$$\arg\min_k \left\{ \frac{\epsilon_c(r)/\gamma}{\left(1+\frac{\epsilon_c(r)}{\gamma m}\right)} \Sigma \phi_i^{t-1}(r) \frac{a(i,j,k)}{c_i} - \frac{\epsilon_0(r)/w_{max}}{\left(1-\frac{\epsilon_0(r)Z(r)}{w_{max}m}\right)} \phi_{obj}^{t-1}(r) w_{j,k} \right\}$$

9:       For all i, $S_i^t(r) = S_i^{t-1}(r) + X_i^t$, and $V^t(r) = V^{t+1}(r) + Y^t$,
10:     end if
11:   end for
12: end for In general the example algorithm above uses an objective function that effectively operates to minimizes costs for an option minus profit for the option where shadow costs are again represented by $\phi$ and the profit is denoted using w. In line 8 for instance, the factor $$\phi_i^{t-1}(r)\frac{a(i,j,k,)}{c_i}$$

represents the total cost and the factor $w_{j,k}$ represents the associated profit for an option. These values are multiplied by various tuning parameters that provide control over the output/efficiency of algorithm and/or scaling factors used to normalize/balance the cost and profit terms.

In operation, the algorithm proceeds in different stages. Initially, a sampling of requests $\epsilon m$ may be evaluated for computational purposes without actually be served. This enables an estimate of the initial costs and/or profits to use for initialization of the algorithm. The evaluation of the objective function returns profit margin values that may be compared for different available options for a given request, as discussed previously. After each stage, the shadow costs are updated accordingly based on the allocation that occurred in the preceding stages. This is reflected in that the cost used for a stage at time t is $\phi_i^{t-1}(r)$, e.g., the cost computed at time t−1.

Having described example implementation details regarding online resource allocation algorithms, consider now a discussion of offline resource allocation algorithms that may incorporate the online resource allocation algorithms.

Offline Resource Allocation Algorithms

In the context of example online algorithms described in the preceding sections, consider now a discussion of offline resource allocation algorithms. Generally speaking, in an offline setting a set of requests for a given problem is received/known in advance. For example, orders for advertising on webpages may be taken on a monthly basis. Thus, a service provider knows the monthly orders in advance and also knows the available resources (e.g., web page impressions) that can be used to serve the orders. In this setting, the service provider may seek an optimal or near optimal "offline" matching of the orders to impressions (e.g., requests to resources) based on profit or another designated objective. In other words, an offline resource allocation algorithm is configured to allocate resources to requests so as to maximize profit without violating resource capacity or other constraints. On the other hand, online allocation problems deal with requests that are obtain randomly one at a time (e.g., stochastically) and accordingly the set of requests is not known in advance. Broadly speaking, the offline resource allocation algorithms discussed herein simulate an offline problem as an online problem and leverage online algorithms to solve the problem.

Figure 5:
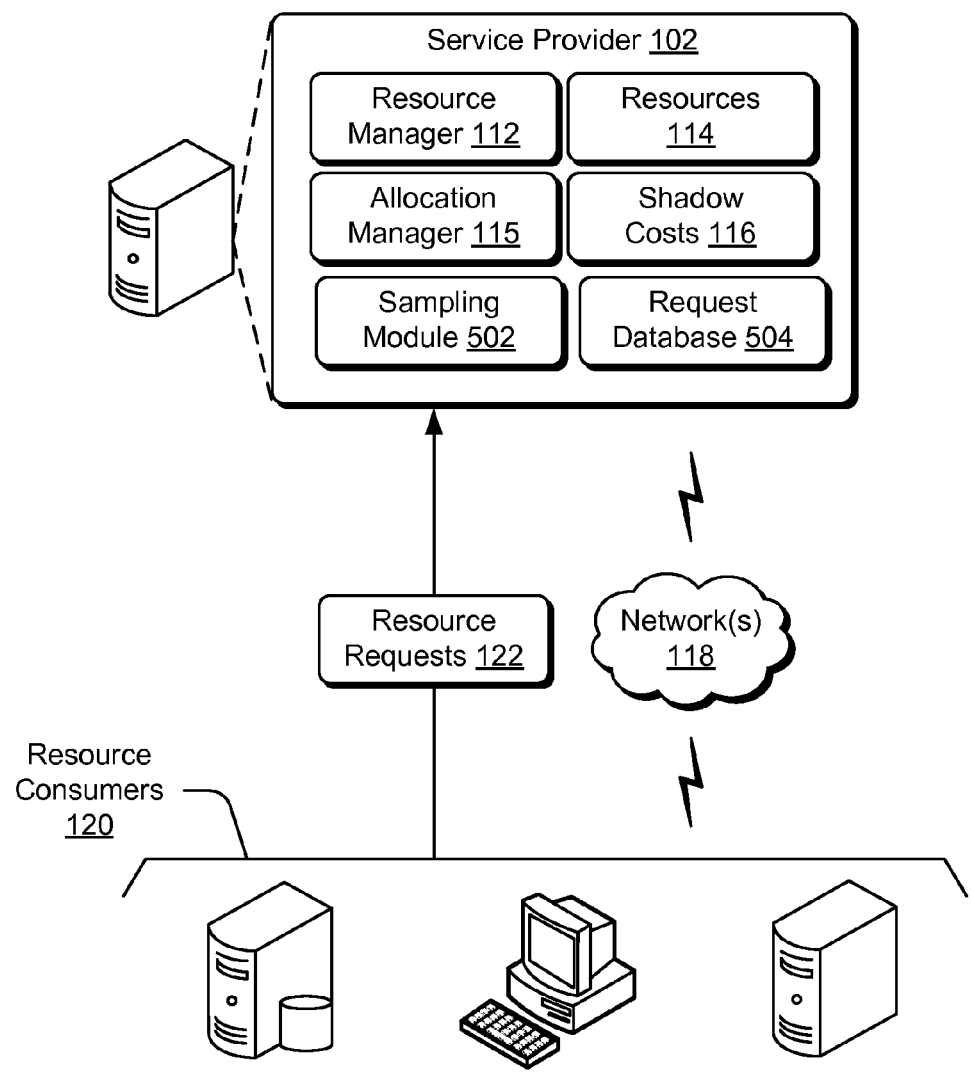
FIG. 5 illustrates an example operating environment in which one or more embodiments of offline resource allocation algorithms can be employed.

FIG. 5 depicts an example environment such as the one discussed in relation to FIG. 1 depicting additional features and components suitable to implement offline resource allocation algorithms. In particular, FIG. 5 illustrates a service provider 102 as previously described that may be connected over a network 118 to resource consumers 120. The resource consumers 120 may provide resource requests 122 to access resources 114 available from the service provider 102. As discussed previously, a resource manager 112 may be provided to manage access to the resources 114, performance of the resources 114, configuration of user interfaces or data to provide the resources 114, and so on. The resource manager 112 may also include or otherwise make use of an allocation manager 115 to determine how to allocate the resources. The allocation manager 115 represents functionality to implement various online and offline algorithms for resource allocation described herein. In at least some embodiments, the allocation manager is configured to manage and use shadow costs 116 associated with various resources 114 to evaluate resource allocation options and pick an to service resource requests.

As further illustrated, the allocation manager 115 may include or otherwise make use of a sampling module 502. The sampling module 502 represents functionality to sample and/or scale resource requests 122 for an offline allocation scenario. For example, resource requests 122 from resource consumers 120 may be collected in advance and maintained in a request database 504 at the service provider 102 or in another suitable storage location. The request database 504 represents offline requests and/or historical logged request data that is known in advance. Thus, a full and/or complete set of requests for an allocation problem may be received "offline" prior to processing to solve the allocation problem. The sampling module 502 may sample requests randomly from the request database 504 and provide the requests as input to the allocation manager 115 to simulate an online scenario for an offline allocation. In some cases, the sampling module 502 may also perform scaling according to a scaling factor such that the number of requests sampled is a representative sample of a complete set of requests (e.g., less than the total number of requests for a particular offline problem). Scaling may be performed to reduce computation, speed-up processing, and/or otherwise simplify analysis of a high volume of offline request data.

Figure 6:
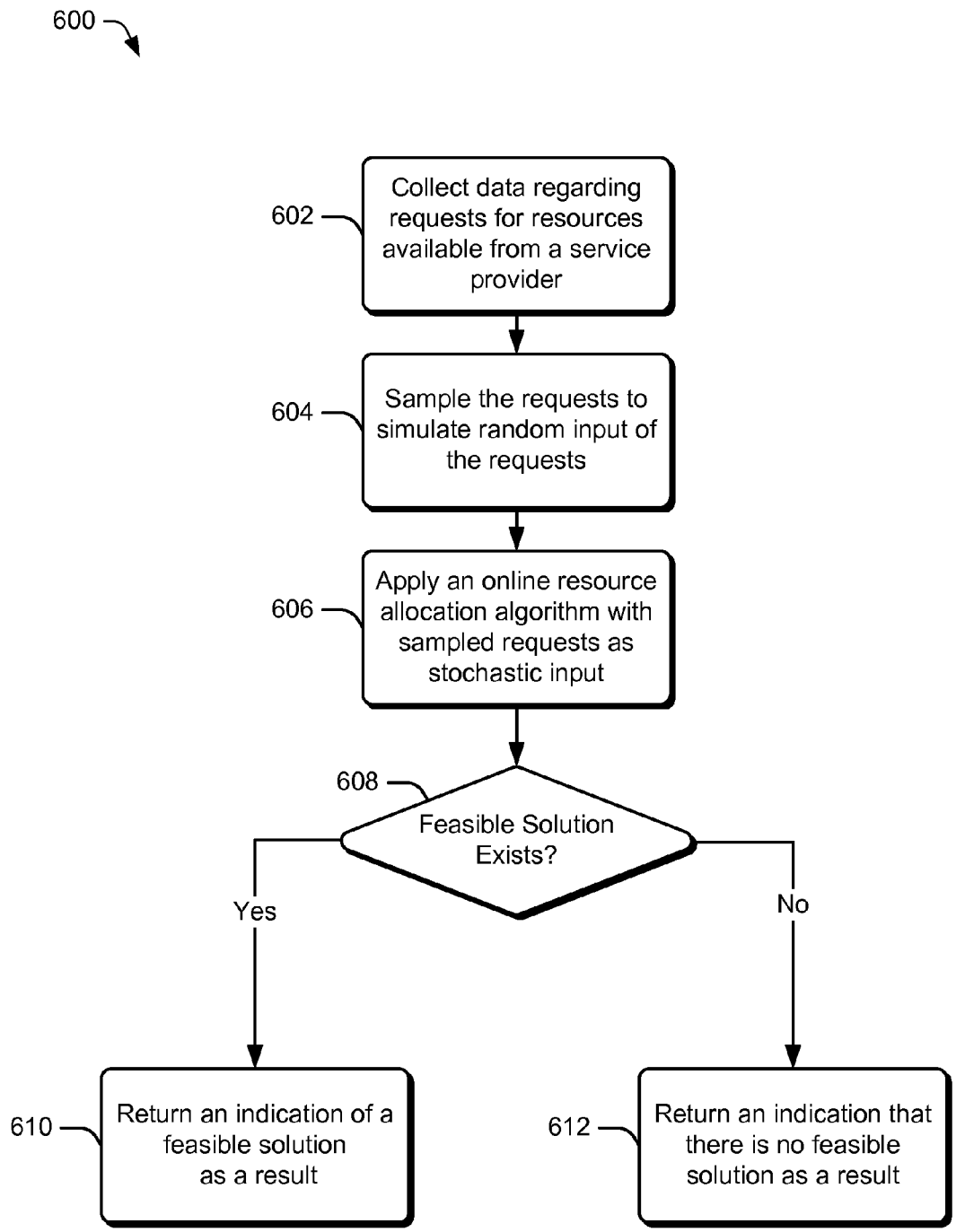
FIG. 6 is a flow diagram that describes details of an example offline resource allocation algorithm in accordance with one or more embodiments.

FIG. 6 is a flow diagram that describes a procedure 600 for an example offline resource allocation algorithm that may use an online resource allocation algorithm as a subroutine in accordance with one or more embodiments. In this example, the offline resource allocation algorithm may operate to determine whether or not a solution is feasible given a set of known requests, available resources, capacity constraints, profit objectives, and other constraints. Data is collected regarding requests for resources from a service provider (block 602). For instance, resource requests 122 from resource consumers 120 may be collected and stored in a request database 504. Requests in a request database 504 may also represent a log of historical request data collected over a period of time. The requests are sampled to simulate random input of the requests (block 604). As mentioned, a sampling module 502 may be provided to sample requests from a request database 504. This may occur in any suitable way. In at least some embodiments, requests are randomly sampled to simulate online receipt of requests one by one from resource consumers 120. The sampled requests may be feed as input to the allocation manager 115. An online algorithm as described previously may then be applied to evaluate the requests and determine whether there is a feasible solution. In particular, an online resource allocation algorithm is applied with the sampled requests as stochastic input (block 606). In other words, the randomly sampled requests are fed one by one into an online algorithm, such as the examples described herein. In general, the online algorithm operates to allocate resources to requests based on shadow costs that are iteratively adjusted after each request is handled.

Based on application of the online resource allocation algorithm, a determination is made regarding whether a feasible solution exists (block 608) for matching the requests to available resources. In other words, the algorithm is configured to evaluate whether the sampled requests may be satisfied to obtain a designated objective (e.g., profit margin, total profit, or other performance metric) without violating any constraints. In at least some embodiments, some constraints may be relaxed such that there is some slack in the determination regarding whether a feasible solution exists. Here, a feasible solution may be considered to exist in cases where the constraints are strictly speaking violated, but remain within an acceptable/configurable margin of error (e.g., constraint relaxation factor). When a feasible solution exists according to the determination, an indication of the feasible solution is returned as a result (block 610). On the other hand, when a feasible solution does not exist according to the determination, an indication that no feasible solution exists is returned as a result (block 612). The indications may be "yes" or "no" values or any other indications suitable to distinguish between feasible and non-feasible cases. In this manner, an offline resource allocation algorithm may be implemented to check whether a solution exists to allocate resources given certain objectives and constraints.

In addition or alternatively, an offline resource allocation algorithm may be employed to obtain a corresponding allocation. In other words, data describing the actual matching of resources to requests may be stored and provided as a result in the yes case, in addition to or in lieu of the feasibility indication. Further details regarding this approach are described just below in relation to FIG. 7.

Figure 7:
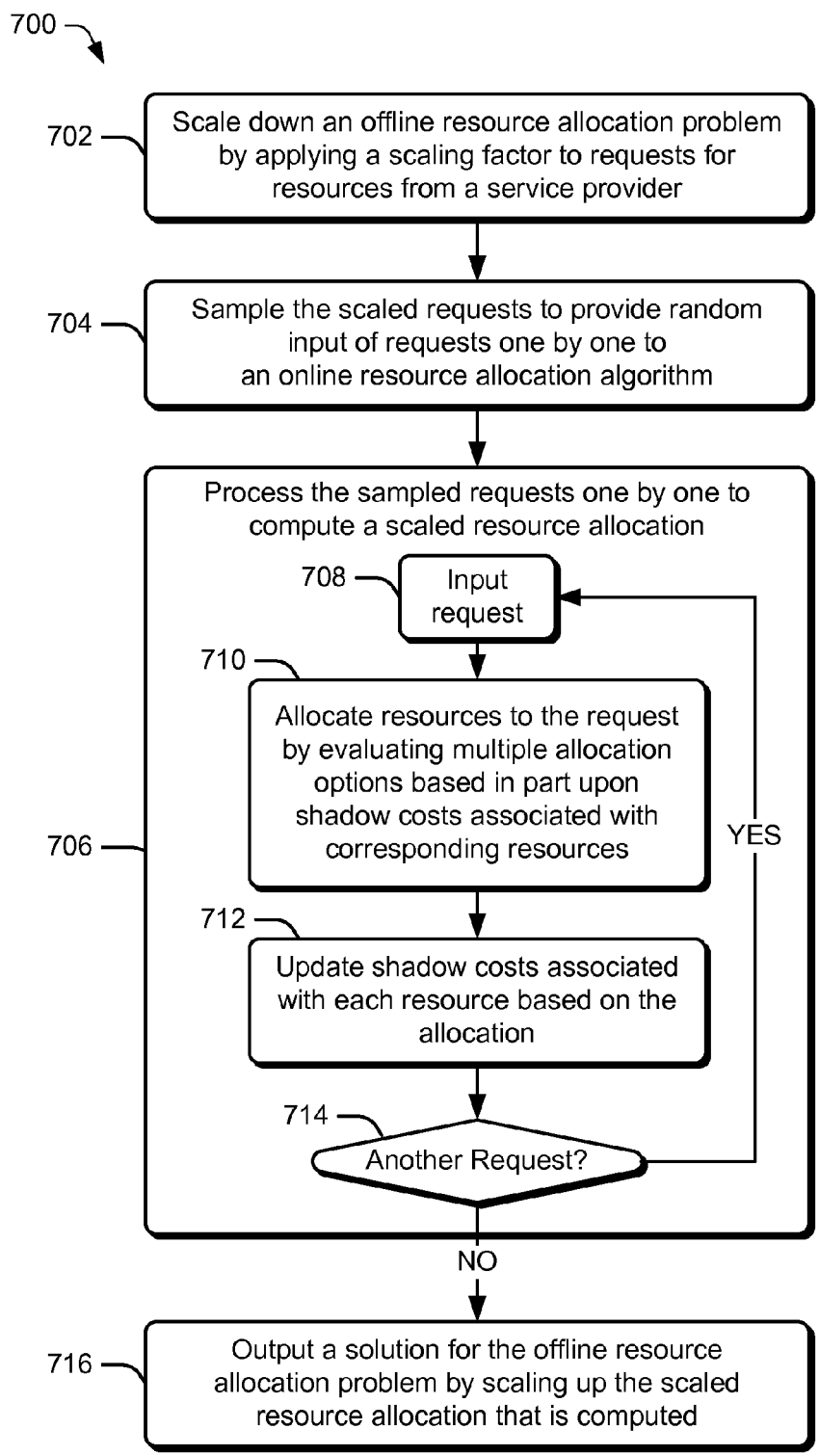
FIG. 7 is a flow diagram that describes details of an example objective function in accordance with one or more embodiments.

In particular, FIG. 7 illustrates a flow diagram that describes a procedure 700 for an example offline resource allocation algorithm in accordance with one or more embodiments. In this example, the offline resource allocation algorithm incorporates an online algorithm as subroutine and operates to compute a resource allocation for an offline scenario when a feasible solution exists. The resource allocation that is computed may be employed for predictive scheduling, capacity management, order handling, and so forth.

An offline resource allocation problem is scaled down by applying a scaling factor to requests for resources from a service provider (block 702). The scaling factor may be selected to provide a representative sample that includes a scaled number of requests less than the complete number of requests for a particular problem. The quantities requested and/or number of requests may be scaled down. The scaling reduces the number of requests for processing down to a relatively small number and therefore may simplify the processing. Scaling may be based on a total number of requests to process, a percentage of the total requests, a quantity reduction factor, and so forth. Of course, if the number of requests associated with a particular problem is already relatively small, the scaling factor may be set to process the complete number of requests (e.g., set scaling factor to 1) and/or scaling may just be skipped. In some scenarios, the capacities of resources may also be scaled back to create a scaled version of the offline resource allocation problem that may involve less computation to solve.

The scaled requests are sampled to provide random input of requests one by one to an online resource allocation algorithm (block 704). Again, the sampling module 502 may randomly pick requests and feed the request to the allocation manager 115 to simulate online input of the requests. The requests may be sampled and input sequentially for processing one by one. This simulates an online problem for the offline request data.

In particular, the online resource allocation algorithm processes the sampled requests one by one to compute a scaled resource allocation (block 706). To do so, each sampled request is input (block 708) and resources are allocated to the request by evaluating multiple allocation options based in part upon shadow costs associated with corresponding resources (block 710). This may occur in the manner previously described using a suitable online algorithm as a subroutine. Effectively, the online algorithm measures a difference between cost and profit (e.g. profit margin) based on constraints and objectives encoded by the algorithm. An allocation of resources is determined by optimizing the objectives for each request, such as maximizing profit, minimizing cost, or satisfying another suitable optimization function. Thus, for example, an option (e.g., matching of particular resources to a particular request) for which profit margin is maximized may be selected for each request that is processed.

After a request is processed, shadow costs associated with each resource are updated based on the allocation (block 712). For instance, shadow costs may be adjusted to reflect different rates of consumption as previously described. Procedure 700 operates iteratively over the sampled requests. Thus, a determination of whether another request remains to be processed may be made after each request is processed (block 714). As long as a request remains at block 714, blocks 708-712 are repeated for the next request to allocate resources to the next request and update shadow costs accordingly. Note that after processing a particular request and updating shadow costs accordingly, the updated shadow costs are used for processing the next request. In this way, the allocation of resources to each of the sampled requests may be determined and the actual matching that is made between resources and requests may be stored in a suitable manner, such as being stored in a database, table, file, or other suitable data structure. Shadow costs computed by evaluating a previous request(s) are used to allocate resources to a subsequent request(s).

After processing of the sampled requests is completed, a solution for the offline resource allocation problem is output by scaling up the scaled resource allocation that is computed (block 716). Here for example, a scaling factor applied to scale the problem down may be used to scale the solution back up. This may involve scaling up the amount of resources allocated to each request based on the scaling factor. Additionally or alternatively, the number of requests or requested quantities may be scaled up so that the solution encompasses the total number of requests associated with the initial offline resource allocation problem. Accordingly, the solution for the offline resource allocation problem may be obtained using sampled and/or scaled requests that are processed using an online resource allocation algorithm.

To further illustrate techniques for offline resource allocation problems, consider the following discussion of an example mixed covering-packing problem, which represents but one example of an offline matching problem to which the described techniques may be applied. For the mixed covering-packing problem, suppose that there are $n_1$ packing constraints, one for each $i \in \{1 \ldots n_1\}$ of the form $\sum_{j=1}^{m} a_{ij} \cdot x_j \leq c_i$ and $n_2$ covering constraints, one for each $i \in \{1 \ldots n_2\}$ of the form $\sum_{j=1}^{m} b_{ij} \cdot x_j \leq d_i$. Each $x_j$ is constrained to be in $P_j$. In this scenario, the described techniques may be employed to determine whether a feasible matching solution exists for the set of constraints given. In particular, an online algorithm having a form comparable to example algorithm in Table 1 above may be applied to the offline matching problem by using sampling and scaling techniques just described. The gap-version of the example mixed covering-packing problem may be expressed as follows:

Distinguish between two cases of (1) feasible solution exists or (2) no feasible solution exists, with a high probability of $1-\delta$. A binary result, such as "Yes" or "No", may be derived, where:
YES: indicates there is a feasible solution.
NO: indicates there is no feasible solution even if all of the $c_i$'s are multiplied by $1+\epsilon$ and all of the $d_i$'s are multiplied by $1+\epsilon$.

Solving an optimization problem offline in the resource allocation framework can be reduced to the above problem through a binary search on the objective function value. Suppose that m is much larger than n. Assume that solving the following costs unit time: given j and v, find $x_j \in P_j$ that maximizes $v \cdot x_j$. Let $$\gamma = \max\left\{i \in [n_1], j \in [m]: \frac{a_{ij} \cdot x_j}{c_i}\right\} \cup \left\{i \in [n_2], j \in [m]: \frac{b_{ij} \cdot x_j}{d_i}\right\}.$$

It may be shown that, for any $\epsilon > 0$, there is an algorithm that solves the above gap version of the mixed covering-packing problem with a running time of $$O\left(\frac{\gamma m \log\left(\frac{n}{\delta}\right)}{\epsilon^2}\right).$$

In particular, the LP for the mixed covering-packing problem may be expressed as follows:

$$\forall i, \sum_{j,k} a(i,j,k) x_{j,k} \leq c_i$$

$$\forall i, \sum_{j,k} b(i,j,k) x_{j,k} \geq d_i$$

$$\forall j, \sum_{k} x_{j,k} \leq 1$$

$$\forall j, k, x_{j,k} \geq 0$$

Again, the goal is to determine whether a feasible solution exists given the set of constraints. In the above expression, the $c_i$'s represent various packing constraints such as the capacity of resources, costs, buyer/seller restrictions, and/or other kinds of limitations placed on resource allocation. The $d_i$'s represent various covering constraints such as the target profit, profit margins, and/or other goals that may be defined for the allocation problem. The quantities indexed by j are referred to as requests, quantities indexed by i are referred to as the resources, and quantities indexed by k are referred to as options. The algorithm operates in steps as described previously. In each step, the algorithm samples a request i.i.d. (independent and identically distributed) from the total number of m possible requests. For instance, the sampling module 502 may operate to sample a request from a request database 504 and feed the request to the allocation manager 115. The allocation manager 115 in turn applies the online algorithm in the manner previously described using shadow costs 116 to derive an allocation for the request. Specifically, if the number of samples $$T \geq \theta\left(\frac{\gamma m \ln\left(\frac{n}{\delta}\right)}{\epsilon^2}\right),$$

then the algorithm solves the gap version of the problem with a probability of $1-\delta$. Since the time taken for serving any given request is one (by taking the time consumed by a single call to be one), this proves that the total run time is $$O\left(\frac{\gamma m \ln\left(\frac{n}{\delta}\right)}{\epsilon^2}\right).$$

Now, let $X_i^t$ and $S_i^T$ be defined as described above in relation to the online algorithms. Also let $Y_i^T$ be the random variables indicating the amount of demand i satisfied during step t, that is $Y_i^T = b(i,j,k)$ if in step t, request j was chosen and served using option k. Let $V_i^T = \sum_{t=1}^{T} Y_i^T$ and further let $$\phi_i^t = \eta_c \left(1 + \frac{\epsilon}{2}\right)^{\frac{S_i^t}{\gamma c_i}} \left(1 + \frac{\epsilon}{2\gamma m}\right)^{T-t},$$

where $$\eta_c = \left(1 + \frac{\epsilon}{2}\right)^{-(1+\frac{\epsilon}{2})\frac{T}{\gamma m}}.$$

Let $$\psi_i^t = \eta_d \left(1 - \frac{\epsilon}{2}\right)^{\frac{V_i^t}{\gamma d_i}} \left(1 - \frac{\epsilon}{2\gamma m}\right)^{T-t},$$

where $$\eta_d = \left(1 - \frac{\epsilon}{2}\right)^{-(1-\frac{\epsilon}{2})\frac{T}{\gamma m}}.$$

Also let $\phi^t = \Sigma_i \phi_i^t$, $\psi^t = \Sigma_i \psi_i^t$, and $\Phi^t + \psi^t$. As before, let $S_i^0 = 0$ and $V_i^0 = 0$. Now the form of the online algorithms previously discussed can be used and applied to solve the LP for the mixed covering-packing problem. In particular, the form of the example algorithm used for the offline problem may be expressed as follows:

ALG Covering-Packing

Given a request j in step t+1, use option:

$$\operatorname{argmin}_k \left\{ \frac{1}{\left(1 + \frac{\epsilon}{2\gamma m}\right)} \sum_i \phi_i^t \frac{a(i,j,k)}{c_i} - \frac{1}{\left(1 - \frac{\epsilon}{2\gamma m}\right)} \sum_i \psi_i^t \frac{b(i,j,k)}{d_i} \right\}$$

Effectively, the above expression computes a minimum of costs (packing constraints) minus profits (covering constraints) in a manner comparable to the preceding online applications. Alternatively, the maximum of profit minus cost may be computed. Thus, the algorithm is configured to maximize profit or another suitable objective. Here, shadow costs are again represented by φ and may be updated after each step to reflect changes in availability and/or rates of consumption of various resources. In the offline setting, the computation is based upon sampled requests from a request database whereas in the online setting requests are received and processed one at a time as the requests are received. The sampling simulates the online instance for the requests from the request database that are collected and/or known in advance of processing.

The factor $$\phi_i^t \frac{a(i,j,k)}{c_i}$$

represents the total cost and the factor $$\psi_i^t \frac{b(i,j,k)}{d_i}$$

represents the associated profit for matching a request j with an option k. These values are multiplied by various tuning parameters that provide control over the output/efficiency of algorithm and/or scaling factors used to normalize/balance the cost and profit terms. The tuning parameters may be configurable constants that may be adjusted to tune the algorithm. For example, total capacities for available resources may be scaled accordingly if the number of sampled requests is scaled. The tuning parameters are represented by the quantities $$\frac{1}{\left(1 + \frac{\epsilon}{2\gamma m}\right)} \text{ and } \frac{1}{\left(1 - \frac{\epsilon}{2\gamma m}\right)}$$

in the above expression.

At the end of T steps, the algorithm checks if $$\max_i \frac{S_i^T}{c_i} < \frac{T}{m}\left(1 + \frac{\epsilon}{2}\right)$$

and if $$\max_i \frac{V_i^T}{d_i} > \frac{T}{m}\left(1 - \frac{\epsilon}{2}\right).$$

If true, the algorithm returns YES as a result. Else the algorithm returns NO as the result. The algorithm returns YES with high probability whenever a feasible solution actually exists. Thus, the algorithm closely approximates the result for actual matching of requests to options even though the requests are scaled and/or sampled for the analysis. Note that the actual allocation of options to requests made by the algorithm may also be stored at each step. Thus, it is straightforward to obtain a computed allocation of resources in addition to the indication of whether or not a matching solution is feasible. If the computed allocation is arrived at by scaling the initial offline allocation problem, the computed allocation may be scaled back up accordingly to produce a resulting allocation for the initial "unscaled" problem that matches the complete set of requests to available resources from a service provider.

Having described example details regarding offline resource allocation algorithms, consider now an example system that can be employed to implement aspects of the described techniques.

Example System

Figure 8:
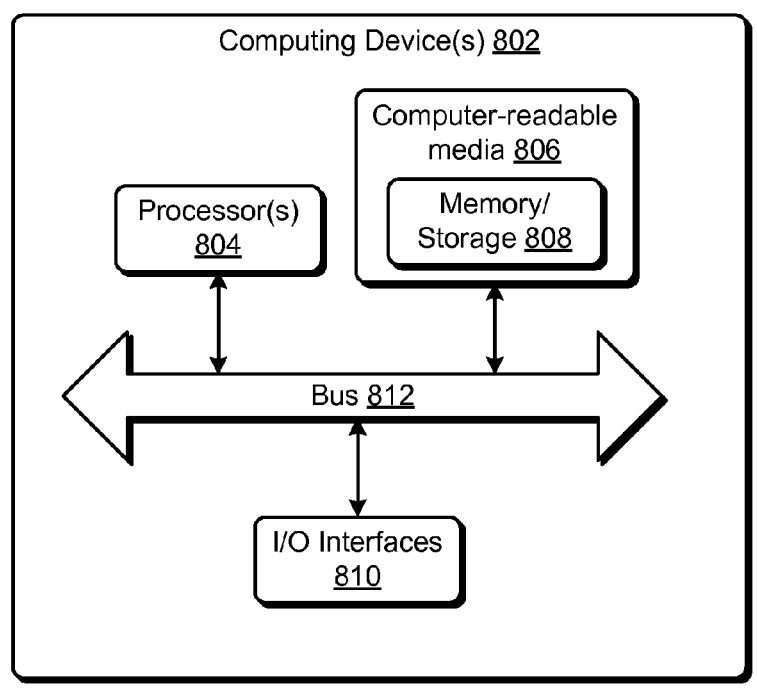
FIG. 8 is a block diagram of a system that can implement the various embodiments.

FIG. 8 illustrates an example system generally at 800 that includes an example computing device 802 that is representative of one or more such computing systems and/or devices that may implement the various embodiments described above. The computing device 802 may be, for example, a server of a service provider 102, a device associated with a client 128 (e.g., a client device), a system on-chip, and/or any other suitable computing device or computing system.

The example computing device 802 includes one or more processors 804 or processing units, one or more computer-readable media 806 which may include one or more memory and/or storage components 808, one or more input/output (I/O) interfaces 810 for input/output (I/O) devices, and a bus 812 that allows the various components and devices to communicate one to another. Computer-readable media 806 and/or one or more I/O devices may be included as part of, or alternatively may be coupled to, the computing device 802. The bus 812 represents one or more of several types of bus structures, including a memory bus or memory controller, a peripheral bus, an accelerated graphics port, and a processor or local bus using any of a variety of bus architectures. The bus 812 may include wired and/or wireless buses.

The one or more processors 804 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The memory/storage component 808 represents memory/storage capacity associated with one or more computer-readable media. The memory/storage component 808 may include volatile media (such as random access memory (RAM)) and/or nonvolatile media (such as read only memory (ROM), Flash memory, optical disks, magnetic disks, and so forth). The memory/storage component 808 may include fixed media (e.g., RAM, ROM, a fixed hard drive, etc.) as well as removable media (e.g., a Flash memory drive, a removable hard drive, an optical disk, and so forth).

Input/output interface(s) 810 allow a user to enter commands and information to computing device 802, and also allow information to be presented to the user and/or other components or devices using various input/output devices. Examples of input devices include a keyboard, a touchscreen display, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software, hardware (fixed logic circuitry), or program modules. Generally, such modules include routines, programs, objects, elements, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. Computer-readable storage media also includes hardware elements having instructions, modules, and/or fixed device logic implemented in a hardware form that may be employed in some embodiments to implement aspects of the described techniques.

The computer-readable storage media includes volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, hardware elements (e.g., fixed logic) of an integrated circuit or chip, or other storage device, tangible media, or article of manufacture suitable to store the desired information and which may be accessed by a computer.

"Communication media" may refer to a signal bearing medium that is configured to transmit instructions to the hardware of the computing device, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

Combinations of any of the above are also included within the scope of computer-readable media. Accordingly, software, hardware, or program modules, including the resource manager 112, resources 114, allocation manager 115, sampling module 502, operating system 110, applications 108 and other program modules, may be implemented as one or more instructions and/or logic embodied on some form of computer-readable media.

Accordingly, particular modules, functionality, components, and techniques described herein may be implemented in software, hardware, firmware and/or combinations thereof. The computing device 802 may be configured to implement particular instructions and/or functions corresponding to the software and/or hardware modules implemented on computer-readable media. The instructions and/or functions may be executable/operable by one or more articles of manufacture (for example, one or more computing devices 802 and/or processors 804) to implement techniques for offline allocation algorithms, as well as other techniques. Such techniques include, but are not limited to, the example procedures described herein. Thus, computer-readable media may be configured to store or otherwise provide instructions that, when executed by one or more devices described herein, cause various techniques for offline allocation algorithms.

CONCLUSION

Although the invention has been described in language specific to structural features and/or methodological steps, it is to be understood that the invention defined in the appended claims is not necessarily limited to the specific features or steps described. Rather, the specific features and steps are disclosed as example forms of implementing the claimed invention.

The invention claimed is:
1. A computer-implemented method comprising:
  collecting data regarding a plurality of requests for resources available from a service provider;
  sampling, from the plurality of requests, a number of requests less than all of the plurality of requests to simulate random input of requests;
  applying an online resource allocation algorithm with the sampled requests as stochastic input, the online resource allocation algorithm configured to, for each request, match said request to resources by evaluating a difference between a profit value and cost computed for different allocation options using an objective function that accounts for shadow costs assigned to the resources corresponding to each of the different allocation options, the shadow costs including computed or estimated costs that are assigned on an individual basis to the resources; and
  determining whether a feasible solution exists to match the sampled requests to the resources based at least in part on the online resource allocation algorithm.
2. The computer-implemented method of claim 1 further comprising:
  retuning an indication of the feasible solution as a result when the feasible solution exits; and returning an indication that there is no feasible solution as the result when the feasible solution does not exist.

3. The computer-implemented method of claim 1 further comprising:
storing data describing an allocation of the resources to the plurality of requests determined by applying the online resource allocation algorithm to the sampled requests; and
returning an indication of the allocation as a result when the feasible solution exists.

4. The computer-implemented method of claim 1, wherein the plurality of requests are collected in advance and stored in a request database.

5. The computer-implemented method of claim 1, wherein the applying comprises:
assigning the shadow costs to the resources available from the service provider;
updating the shadow costs associated with the resources after evaluating each request to reflect differences in rates of consumption for the resources; and
allocating resources to each request using the updated shadow costs determined based on evaluating previous requests.

6. The computer-implemented method of claim 1, wherein the applying comprises selecting an option for each request that maximizes a profit margin computed for the different allocation options using the shadow costs.

7. The computer-implemented method of claim 1, further comprising scaling the plurality of requests according to a scaling factor.

8. The computer-implemented method of claim 1, wherein the online resource allocation algorithm is configured to select an option k for a request j at time t+1 as:

$$\operatorname{argmin}_k \left\{ \frac{1}{\left(1 + \frac{\epsilon}{2\gamma m}\right)} \sum_i \phi_i^t \frac{a(i, j, k)}{c_i} - \frac{1}{\left(1 - \frac{\epsilon}{2\gamma m}\right)} \sum_i \psi_i^t \frac{b(i, j, k)}{d_i} \right\}$$

wherein $\phi_i^t$ represents shadow costs at time t, and $\psi_i^t$ represents a profit value for using the option k for the request j.

9. One or more computer-readable storage media storing instructions that, when executed by one or more server devices of a service provider, cause the one or more server devices to implement an allocation manager configured to:
randomly sample, from a database of requests collected by the service provider in advance, a number of requests for resources from the service provider less than all of the requests in the database to simulate receipt of the requests one by one from resource consumers; and
process the sampled requests one by one to match the resources to the requests, including for each request:
identifying one or more options of available resources to satisfy the request;
evaluating a difference between profit and cost computed for each of the options using an objective function that accounts for shadow costs assigned to the resources corresponding to each of the options;
selecting an option to fulfill the request that maximizes profit margin based on the evaluation of the differences between profits and costs; and
allocating resources corresponding to the selected option to the request.

10. One or more computer-readable storage media of claim 9, wherein the allocation manager is further configured to update shadow costs associated with each resource after each sampled request is processed to reflect changes in rates of consumption for the resources.

11. One or more computer-readable storage media of claim 10, wherein updating the shadow costs associated with each resource based on the allocation comprises increasing the shadow cost corresponding to a resource as consumption of the resource increases.

12. One or more computer-readable storage media of claim 9, further comprising applying a scaling factor to select a reduced number of the requests to process.

13. One or more computer-readable storage media of claim 9, wherein the objective function identifies a particular option of the one or more options for which the cost subtracted from the profit is maximized.

14. One or more computer-readable storage media of claim 9, wherein the requests for resources comprise orders from advertisers for advertising impressions available from the service provider via webpages served to clients by the service provider.

15. One or more computer-readable storage media of claim 9, wherein identifying one or more options of available resources comprises matching one or more request constraints specified by the request with the resources having associated resource constraints such that the request constraints and resource constraints are satisfied.

16. A computing system comprising:
one or more processors; and
computer readable storage media having one or more modules stored thereon, that, when executed via the one or more processors, cause the computing system to perform operations including:
applying a scaling factor to scale down a number of requests for resources available from a service provider associated with an offline resource allocation problem to produce a representative sample of the requests for resources;
sampling the scaled requests to provide random input of the requests one by one to an online resource allocation algorithm;
processing the sampled requests one by one to compute a scaled resource allocation that matches resources to the scaled requests, including for each particular request:
allocating resources to the particular request by evaluating multiple allocation options based in part upon shadow costs associated with corresponding resources;
updating the shadow costs to reflect changes in rates of consumption for corresponding resources based on the allocation to the particular request; and
using the updated shadow costs to evaluate options for allocation of resources to a next request.

17. The computing system of claim 16, wherein the one or more modules, when executed, cause the computing system to perform further operations including:
outputting a solution for the offline resource allocation problem by scaling up the scaled resource allocation that is computed.

18. The computing system of claim 16, wherein allocating resources to the particular request comprises applying the online resource allocation algorithm to compute a profit margin associated with using each of the multiple allocation options to serve the particular request and select an option of the multiple allocation options that maximizes the profit margin for the particular request.

19. The computing system of claim 16, wherein the requests comprise orders from an advertiser for impressions to enable the advertiser to place advertisements for presentation to clients in conjunction with resources provided by the service provider to clients in webpages.

20. The computer system of claim 16, wherein the one or more modules, when executed, cause the computing system to perform further operations including:
   collecting from resource consumers the requests for the resources available from the service provider such that a complete set of requests for the offline resource allocation problem is received in advance of processing.

* * * * *